(12) United States Patent
Inoue

(10) Patent No.: US 8,195,355 B2
(45) Date of Patent: Jun. 5, 2012

(54) FAULT DIAGNOSIS SYSTEM IN LOAD DRIVING ARRANGEMENT AND FUEL PUMP CONTROL SYSTEM

(75) Inventor: Tetsuji Inoue, Nagoya (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 912 days.

(21) Appl. No.: 12/223,033

(22) PCT Filed: Feb. 7, 2007

(86) PCT No.: PCT/JP2007/052538
§ 371 (c)(1),
(2), (4) Date: Jul. 21, 2008

(87) PCT Pub. No.: WO2007/097226
PCT Pub. Date: Aug. 30, 2007

(65) Prior Publication Data
US 2009/0024271 A1   Jan. 22, 2009

(30) Foreign Application Priority Data

Feb. 21, 2006 (JP) .................................. 2006-044376
Oct. 17, 2006 (JP) .................................. 2006-282545

(51) Int. Cl.
*G01M 17/00* (2006.01)
*G01R 31/14* (2006.01)
(52) U.S. Cl. ........................................ 701/29.1; 324/511
(58) Field of Classification Search .................... 701/29; 324/537, 605–606
See application file for complete search history.

(56) References Cited

U.S. PATENT DOCUMENTS

| 5,483,817 | A  | * | 1/1996  | Renard et al.  | 73/1.82   |
|-----------|----|---|---------|----------------|-----------|
| 6,412,713 | B2 | * | 7/2002  | Okajima et al. | 239/585.1 |
| 6,737,868 | B2 | * | 5/2004  | Takagi         | 324/414   |
| 6,831,466 | B2 | * | 12/2004 | Down et al.    | 324/555   |
| 6,909,275 | B2 | * | 6/2005  | Hartzsch       | 324/713   |

(Continued)

FOREIGN PATENT DOCUMENTS

DE    103 42 268 A1    4/2004

(Continued)

OTHER PUBLICATIONS

Machine translation of Hosoya (JP2005-337167).*

(Continued)

*Primary Examiner* — Darnell Jayne
*Assistant Examiner* — Andrew Roersma
(74) *Attorney, Agent, or Firm* — Oliff & Berridge, PLC

(57) ABSTRACT

In a fault diagnosis system (10) in a load driving arrangement, the fault diagnosis system detecting a fault in the load driving arrangement in which a controller (13) outputs a control signal to a driver (12) and the driver (12) drives a load (11) according to the control signal, a fault detecting unit (21) and an exclusive OR circuit (22) are provided to enable outputting, as a monitor signal, a signal opposite to the control signal upon detecting a fault in the load driving arrangement and outputting, as a monitor signal, the same signal as the control signal when not detecting a fault, a monitor signal output from the exclusive OR circuit (22) is input to the controller (13), and the controller (13) compares the control signal and the monitor signal and diagnoses whether a fault occurs in the load driving arrangement, based on the result of the comparison.

18 Claims, 19 Drawing Sheets

U.S. PATENT DOCUMENTS

| | | | |
|---|---|---|---|
| 6,940,290 B2 * | 9/2005 | Ishida | 324/609 |
| 7,035,749 B2 * | 4/2006 | Cirkel | 702/117 |
| 7,123,025 B2 * | 10/2006 | Awaji et al. | 324/647 |
| 7,183,934 B2 * | 2/2007 | Alvord | 340/635 |
| 2004/0164744 A1 * | 8/2004 | Koga et al. | 324/537 |
| 2005/0270038 A1 * | 12/2005 | Goishi | 324/606 |
| 2006/0082347 A1 * | 4/2006 | Asada | 322/59 |
| 2007/0098978 A1 * | 5/2007 | Tanaka et al. | 428/336 |
| 2008/0288134 A1 * | 11/2008 | Matsuo et al. | 701/29 |

FOREIGN PATENT DOCUMENTS

| | | |
|---|---|---|
| DE | 103 19 397 A1 | 12/2004 |
| DE | 10 2004 028 515 B3 | 11/2005 |
| EP | 1 036 923 A2 | 9/2000 |
| EP | 1 441 120 A2 | 7/2004 |
| JP | A-10-299565 | 11/1998 |
| JP | A-2001-86639 | 3/2001 |
| JP | A-2005-337167 | 12/2005 |
| WO | WO 95/06814 A1 | 3/1995 |
| WO | WO 2005/098561 A1 | 10/2005 |
| WO | WO 2005/121535 A1 | 12/2005 |

OTHER PUBLICATIONS

Japanese Office Action dated Nov. 16, 2010 issued in Japanese Patent Application No. 2006-282545 (with translation).

* cited by examiner

FIG. 3

| CONDITION NO. | PRESENCE/ABSENCE OF FAULT (○:NORMAL ●:FAULT) | | | | | | | CONTROL SIGNAL OUTPUT FROM CONTROLLER | CONTROL SIGNAL INPUT INTO DRIVER | PROPER LOAD DRIVING | ACTUAL LOAD DRIVING | PROPER MONITOR SIGNAL REQUESTED BY CONTROLLER | ACTUAL MONITOR SIGNAL INPUT INTO CONTROLLER |
|---|---|---|---|---|---|---|---|---|---|---|---|---|---|
| | FAULT IN LOAD OR DRIVER ITSELF | FAULT IN SIGNAL LINE | | | | | | | | | | | |
| | | CONTROL SIGNAL LINE | | MONITOR SIGNAL LINE | | | | | | | | | |
| | | BROKEN | SHORT TO GROUND | SHORT TO SUPPLY | BROKEN | SHORT TO GROUND | SHORT TO SUPPLY | | | | | | |
| 1 | ○ | ○ | ○ | ○ | ○ | ○ | ○ | Hi(H) | Hi(H) | Hi(H) | Hi(H) | Hi(N) | Hi(N) |
| 2 | ○ | ○ | ○ | ○ | ○ | ○ | ○ | Lo(L) | Lo(L) | Lo(L) | Lo(L) | Lo(N) | Lo(N) |
| 3 | ● | ○ | ○ | ○ | ○ | ○ | ○ | Hi(H) | Hi(H) | Hi(H) | — | Lo(F) | Lo(F) |
| 4 | ● | ○ | ○ | ○ | ○ | ○ | ○ | Lo(L) | Lo(L) | Lo(L) | — | Hi(F) | Hi(F) |
| 5 | ○ | ● | ○ | ○ | ○ | ○ | ○ | Hi(H) | Lo(L) | Hi(H) | Lo(L) | Hi(F) | Lo(F) |
| 6 | ○ | ● | ○ | ○ | ○ | ○ | ○ | Lo(L) | Lo(L) | Lo(L) | Lo(L) | Hi(F) | Lo(N) |
| 7 | ○ | ○ | ● | ○ | ○ | ○ | ○ | Hi(H) | Lo(L) | Hi(H) | Lo(L) | Hi(F) | Lo(F) |
| 8 | ○ | ○ | ● | ○ | ○ | ○ | ○ | Lo(L) | Lo(L) | Lo(L) | Lo(L) | Hi(F) | Lo(N) |
| 9 | ○ | ○ | ○ | ● | ○ | ○ | ○ | Hi(H) | Hi(H) | Hi(H) | Hi(H) | Hi(N) | Hi(N) |
| 10 | ○ | ○ | ○ | ● | ○ | ○ | ○ | Lo(L) | Hi(H) | Lo(L) | Hi(H) | Lo(F) | Hi(F) |
| 11 | ○ | ○ | ○ | ○ | ● | ○ | ○ | Hi(H) | Hi(H) | Hi(H) | Hi(H) | Hi(N) | Lo(F) |
| 12 | ○ | ○ | ○ | ○ | ● | ○ | ○ | Lo(L) | Lo(L) | Lo(L) | Lo(L) | Lo(F) | Lo(F) |
| 13 | ○ | ○ | ○ | ○ | ○ | ● | ○ | Hi(H) | Hi(H) | Hi(H) | Hi(H) | Hi(N) | Lo(N) |
| 14 | ○ | ○ | ○ | ○ | ○ | ● | ○ | Lo(L) | Lo(L) | Lo(L) | Lo(L) | Lo(F) | Lo(F) |
| 15 | ○ | ○ | ○ | ○ | ○ | ○ | ● | Hi(H) | Hi(H) | Hi(H) | Hi(H) | Hi(F) | Hi(N) |
| 16 | ○ | ○ | ○ | ○ | ○ | ○ | ● | Lo(L) | Lo(L) | Lo(L) | Lo(L) | Hi(F) | Hi(F) |

(H:HIGH SPEED, L:LOW SPEED, N:NORMAL, F:FAULT)

FIG. 5

| CONDITION NO. | FAULT IN LOAD OR DRIVER ITSELF | FAULT IN SIGNAL LINE - CONTROL SIGNAL LINE | | | FAULT IN SIGNAL LINE - MONITOR SIGNAL LINE | | | CONTROL SIGNAL OUTPUT FROM CONTROLLER | CONTROL SIGNAL INPUT INTO DRIVER | PROPER LOAD DRIVING | ACTUAL LOAD DRIVING | PROPER MONITOR SIGNAL REQUESTED BY CONTROLLER | ACTUAL MONITOR SIGNAL INPUT INTO CONTROLLER |
|---|---|---|---|---|---|---|---|---|---|---|---|---|---|
| | | BROKEN | SHORT TO GROUND | SHORT TO SUPPLY | BROKEN | SHORT TO GROUND | SHORT TO SUPPLY | | | | | | |
| 17 | ○ | ○ | ○ | ○ | ○ | ○ | ○ | Hi(H) | Hi(H) | Hi(H) | Hi(H) | Hi(N) | Hi(N) |
| 18 | ○ | ○ | ○ | ○ | ○ | ○ | ○ | Lo(L) | Lo(L) | Lo(L) | Lo(L) | Lo(N) | Lo(N) |
| 19 | ● | ○ | ○ | ○ | ○ | ○ | ○ | Hi(H) | Hi(H) | Hi(H) | — | Lo(F) | Lo(F) |
| 20 | ● | ○ | ○ | ○ | ○ | ○ | ○ | Lo(L) | Lo(L) | Lo(L) | — | Hi(F) | Hi(F) |
| 21 | ○ | ● | ○ | ○ | ○ | ○ | ○ | Hi(H) | Hi(H) | Hi(H) | Hi(H) | Lo(F) | Hi(N) |
| 22 | ○ | ● | ○ | ○ | ○ | ○ | ○ | Lo(L) | Hi(H) | Lo(L) | Hi(H) | Hi(F) | Hi(F) |
| 23 | ○ | ○ | ● | ○ | ○ | ○ | ○ | Hi(H) | Lo(L) | Hi(H) | Lo(L) | Lo(F) | Lo(F) |
| 24 | ○ | ○ | ● | ○ | ○ | ○ | ○ | Lo(L) | Lo(L) | Lo(L) | Lo(L) | Hi(F) | Lo(N) |
| 25 | ○ | ○ | ○ | ● | ○ | ○ | ○ | Hi(H) | Hi(H) | Hi(H) | Hi(H) | Lo(F) | Hi(N) |
| 26 | ○ | ○ | ○ | ● | ○ | ○ | ○ | Lo(L) | Hi(H) | Lo(L) | Hi(H) | Hi(F) | Hi(F) |
| 27 | ○ | ○ | ○ | ○ | ● | ○ | ○ | Hi(H) | Hi(H) | Hi(H) | Hi(H) | Lo(F) | Lo(F) |
| 28 | ○ | ○ | ○ | ○ | ● | ○ | ○ | Lo(L) | Lo(L) | Lo(L) | Lo(L) | Hi(F) | Hi(F) |
| 29 | ○ | ○ | ○ | ○ | ○ | ● | ○ | Hi(H) | Hi(H) | Hi(H) | Hi(H) | Hi(F) | Lo(F) |
| 30 | ○ | ○ | ○ | ○ | ○ | ● | ○ | Lo(L) | Lo(L) | Lo(L) | Lo(L) | Lo(F) | Lo(N) |
| 31 | ○ | ○ | ○ | ○ | ○ | ○ | ● | Hi(H) | Hi(H) | Hi(H) | Hi(H) | Lo(F) | Hi(N) |
| 32 | ○ | ○ | ○ | ○ | ○ | ○ | ● | Lo(L) | Lo(L) | Lo(L) | Lo(L) | Hi(F) | Hi(F) |

(H:HIGH SPEED, L:LOW SPEED, N:NORMAL, F:FAULT)

(PRESENCE/ABSENCE OF FAULT (○: NORMAL ●: FAULT))

FIG. 7

| CONDITION NO. | FAULT IN LOAD OR DRIVER ITSELF | PRESENCE/ABSENCE OF FAULT (○:NORMAL ●:FAULT) FAULT IN SIGNAL LINE | | | | | | CONTROL SIGNAL OUTPUT FROM CONTROLLER | CONTROL SIGNAL INPUT INTO DRIVER | PROPER LOAD DRIVING | ACTUAL LOAD DRIVING | PROPER MONITOR SIGNAL REQUESTED BY CONTROLLER | ACTUAL MONITOR SIGNAL INPUT INTO CONTROLLER |
|---|---|---|---|---|---|---|---|---|---|---|---|---|---|
| | | CONTROL SIGNAL LINE | | MONITOR SIGNAL LINE | | | | | | | | | |
| | | BROKEN | SHORT TO GROUND | SHORT TO SUPPLY | BROKEN | SHORT TO GROUND | SHORT TO SUPPLY | | | | | | |
| 33 | ○ | ○ | ○ | ○ | ○ | ○ | ○ | Hi(H) | Hi(H) | Hi(H) | Hi(H) | Hi(N) | Hi(N) |
| 34 | ○ | ○ | ○ | ○ | ○ | ○ | ○ | Lo(L) | Lo(L) | Lo(L) | Lo(L) | Lo(N) | Lo(N) |
| 35 | ● | ○ | ○ | ○ | ○ | ○ | ○ | Hi(H) | Hi(H) | Hi(H) | — | Lo(F) | Lo(F) |
| 36 | ● | ○ | ○ | ○ | ○ | ○ | ○ | Lo(L) | Lo(L) | Lo(L) | — | Hi(F) | Hi(F) |
| 37 | ○ | ● | ○ | ○ | ○ | ○ | ○ | Hi(H) | Lo(L) | Hi(H) | Lo(L) | Lo(F) | Lo(F) |
| 38 | ○ | ● | ○ | ○ | ○ | ○ | ○ | Lo(L) | Lo(L) | Lo(L) | Lo(L) | Hi(F) | Lo(N) |
| 39 | ○ | ○ | ● | ○ | ○ | ○ | ○ | Hi(H) | Lo(L) | Hi(H) | Lo(L) | Lo(F) | Lo(F) |
| 40 | ○ | ○ | ● | ○ | ○ | ○ | ○ | Lo(L) | Lo(L) | Lo(L) | Lo(L) | Hi(F) | Lo(N) |
| 41 | ○ | ○ | ○ | ● | ○ | ○ | ○ | Hi(H) | Hi(H) | Hi(H) | Hi(H) | Hi(F) | Hi(N) |
| 42 | ○ | ○ | ○ | ● | ○ | ○ | ○ | Lo(L) | Hi(H) | Lo(L) | Hi(H) | Lo(F) | Hi(F) |
| 43 | ○ | ○ | ○ | ○ | ● | ○ | ○ | Hi(H) | Hi(H) | Hi(H) | Hi(H) | Lo(F) | Hi(F) |
| 44 | ○ | ○ | ○ | ○ | ● | ○ | ○ | Lo(L) | Lo(L) | Lo(L) | Lo(L) | Hi(F) | Hi(F) |
| 45 | ○ | ○ | ○ | ○ | ○ | ● | ○ | Hi(H) | Hi(H) | Hi(H) | Hi(H) | Lo(F) | Lo(F) |
| 46 | ○ | ○ | ○ | ○ | ○ | ● | ○ | Lo(L) | Lo(L) | Lo(L) | Lo(L) | Hi(F) | Lo(N) |
| 47 | ○ | ○ | ○ | ○ | ○ | ○ | ● | Hi(H) | Hi(H) | Hi(H) | Hi(H) | Lo(F) | Hi(N) |
| 48 | ○ | ○ | ○ | ○ | ○ | ○ | ● | Lo(L) | Lo(L) | Lo(L) | Lo(L) | Hi(F) | Hi(F) |

(H:HIGH SPEED, L:LOW SPEED, N:NORMAL, F:FAULT)

FIG. 9

| CONDITION NO. | FAULT IN LOAD OR DRIVER ITSELF | PRESENCE/ABSENCE OF FAULT (○:NORMAL ●:FAULT) FAULT IN SIGNAL LINE | | | | | CONTROL SIGNAL OUTPUT FROM CONTROLLER | CONTROL SIGNAL INPUT INTO DRIVER | PROPER LOAD DRIVING | ACTUAL LOAD DRIVING | PROPER MONITOR SIGNAL REQUESTED BY CONTROLLER | ACTUAL MONITOR SIGNAL INPUT INTO CONTROLLER |
|---|---|---|---|---|---|---|---|---|---|---|---|---|
| | | CONTROL SIGNAL LINE | | MONITOR SIGNAL LINE | | | | | | | | |
| | | BROKEN | SHORT TO GROUND | SHORT TO SUPPLY | BROKEN | SHORT TO GROUND | SHORT TO SUPPLY | | | | | | |
| 49 | ○ | ○ | ○ | ○ | ○ | ○ | ○ | Hi(H) | Hi(H) | Hi(H) | Hi(H) | Hi(N) | Hi(N) |
| 50 | ○ | ○ | ○ | ○ | ○ | ○ | ○ | Lo(L) | Lo(L) | Lo(L) | Lo(L) | Lo(N) | Lo(N) |
| 51 | ● | ○ | ○ | ○ | ○ | ○ | ○ | Hi(H) | Hi(H) | Hi(H) | — | Lo(F) | Lo(F) |
| 52 | ● | ○ | ○ | ○ | ○ | ○ | ○ | Lo(L) | Lo(L) | Lo(L) | — | Hi(F) | Hi(F) |
| 53 | ○ | ● | ○ | ○ | ○ | ○ | ○ | Hi(H) | Lo(L) | Hi(H) | Lo(L) | Lo(F) | Hi(N) |
| 54 | ○ | ● | ○ | ○ | ○ | ○ | ○ | Lo(L) | Lo(L) | Lo(L) | Lo(L) | Hi(F) | Hi(F) |
| 55 | ○ | ○ | ● | ○ | ○ | ○ | ○ | Hi(H) | Lo(L) | Hi(H) | Lo(L) | Lo(F) | Lo(F) |
| 56 | ○ | ○ | ● | ○ | ○ | ○ | ○ | Lo(L) | Lo(L) | Lo(L) | Lo(L) | Hi(F) | Hi(F) |
| 57 | ○ | ○ | ○ | ● | ○ | ○ | ○ | Hi(H) | Hi(H) | Hi(H) | Hi(H) | Lo(F) | Lo(N) |
| 58 | ○ | ○ | ○ | ● | ○ | ○ | ○ | Lo(L) | Hi(H) | Lo(L) | Hi(H) | Hi(F) | Hi(F) |
| 59 | ○ | ○ | ○ | ○ | ● | ○ | ○ | Hi(H) | Hi(H) | Hi(H) | Hi(H) | Hi(F) | Lo(F) |
| 60 | ○ | ○ | ○ | ○ | ● | ○ | ○ | Lo(L) | Lo(L) | Lo(L) | Lo(L) | Lo(F) | Lo(F) |
| 61 | ○ | ○ | ○ | ○ | ○ | ● | ○ | Hi(H) | Hi(H) | Hi(H) | Hi(H) | Hi(F) | Lo(F) |
| 62 | ○ | ○ | ○ | ○ | ○ | ● | ○ | Lo(L) | Lo(L) | Lo(L) | Lo(L) | Lo(F) | Lo(F) |
| 63 | ○ | ○ | ○ | ○ | ○ | ○ | ● | Hi(H) | Hi(H) | Hi(H) | Hi(H) | Hi(F) | Hi(N) |
| 64 | ○ | ○ | ○ | ○ | ○ | ○ | ● | Lo(L) | Lo(L) | Lo(L) | Lo(L) | Hi(F) | Hi(F) |

(H:HIGH SPEED, L:LOW SPEED, N:NORMAL, F:FAULT)

FIG. 11

| CONDITION NO. | FAULT IN LOAD OR DRIVER ITSELF | FAULT IN SIGNAL LINE — CONTROL SIGNAL LINE BROKEN | CONTROL SIGNAL LINE SHORT TO GROUND | CONTROL SIGNAL LINE SHORT TO SUPPLY | MONITOR SIGNAL LINE BROKEN | MONITOR SIGNAL LINE SHORT TO GROUND | MONITOR SIGNAL LINE SHORT TO SUPPLY | CONTROL SIGNAL OUTPUT FROM CONTROLLER | CONTROL SIGNAL INPUT INTO DRIVER | PROPER LOAD DRIVING | ACTUAL LOAD DRIVING | PROPER MONITOR SIGNAL REQUESTED BY CONTROLLER | ACTUAL MONITOR SIGNAL INPUT INTO CONTROLLER |
|---|---|---|---|---|---|---|---|---|---|---|---|---|---|
| 65 | ○ | ○ | ○ | ○ | ○ | ○ | ○ | Hi(H) | Hi(H) | Hi(H) | Hi(H) | Lo(N) | Lo(N) |
| 66 | ○ | ○ | ○ | ○ | ○ | ○ | ○ | Lo(L) | Lo(L) | Lo(L) | Lo(L) | Hi(N) | Hi(N) |
| 67 | ● | ○ | ○ | ○ | ○ | ○ | ○ | Hi(H) | Hi(H) | Hi(H) | — | Hi(F) | Hi(F) |
| 68 | ● | ○ | ○ | ○ | ○ | ○ | ○ | Lo(L) | Lo(L) | Lo(L) | — | Lo(F) | Lo(F) |
| 69 | ○ | ● | ○ | ○ | ○ | ○ | ○ | Hi(H) | Lo(L) | Hi(H) | Lo(L) | Hi(F) | Hi(F) |
| 70 | ○ | ● | ○ | ○ | ○ | ○ | ○ | Lo(L) | Lo(L) | Lo(L) | Lo(L) | Lo(F) | Hi(N) |
| 71 | ○ | ○ | ● | ○ | ○ | ○ | ○ | Hi(H) | Lo(L) | Hi(H) | Lo(L) | Hi(F) | Hi(F) |
| 72 | ○ | ○ | ● | ○ | ○ | ○ | ○ | Lo(L) | Lo(L) | Lo(L) | Lo(L) | Lo(F) | Hi(N) |
| 73 | ○ | ○ | ○ | ● | ○ | ○ | ○ | Hi(H) | Hi(H) | Hi(H) | Hi(H) | Hi(F) | Lo(N) |
| 74 | ○ | ○ | ○ | ● | ○ | ○ | ○ | Lo(L) | Hi(H) | Lo(L) | Hi(H) | Lo(F) | Lo(F) |
| 75 | ○ | ○ | ○ | ○ | ● | ○ | ○ | Hi(H) | Hi(H) | Hi(H) | Hi(H) | Hi(F) | Lo(N) |
| 76 | ○ | ○ | ○ | ○ | ● | ○ | ○ | Lo(L) | Lo(L) | Lo(L) | Lo(L) | Lo(F) | Lo(N) |
| 77 | ○ | ○ | ○ | ○ | ○ | ● | ○ | Hi(H) | Hi(H) | Hi(H) | Hi(H) | Hi(F) | Lo(F) |
| 78 | ○ | ○ | ○ | ○ | ○ | ● | ○ | Lo(L) | Lo(L) | Lo(L) | Lo(L) | Lo(F) | Lo(F) |
| 79 | ○ | ○ | ○ | ○ | ○ | ○ | ● | Hi(H) | Hi(H) | Hi(H) | Hi(H) | Hi(F) | Hi(F) |
| 80 | ○ | ○ | ○ | ○ | ○ | ○ | ● | Lo(L) | Lo(L) | Lo(L) | Lo(L) | Lo(F) | Hi(N) |

(PRESENCE/ABSENCE OF FAULT (○:NORMAL ●:FAULT))
(H:HIGH SPEED, L:LOW SPEED, N:NORMAL, F:FAULT)

FIG. 12

| CONDITION NO. | FAULT IN LOAD OR DRIVER ITSELF | PRESENCE/ABSENCE OF FAULT (○:NORMAL ●:FAULT) FAULT IN SIGNAL LINE | | | | | | CONTROL SIGNAL OUTPUT FROM CONTROLLER | CONTROL SIGNAL INPUT INTO DRIVER | PROPER LOAD DRIVING | ACTUAL LOAD DRIVING | PROPER MONITOR SIGNAL REQUESTED BY CONTROLLER | ACTUAL MONITOR SIGNAL INPUT INTO CONTROLLER |
|---|---|---|---|---|---|---|---|---|---|---|---|---|---|
| | | CONTROL SIGNAL LINE | | MONITOR SIGNAL LINE | | | | | | | | | |
| | | BROKEN | SHORT TO GROUND | SHORT TO SUPPLY | BROKEN | SHORT TO GROUND | SHORT TO SUPPLY | | | | | | |
| 81 | ○ | ○ | ○ | ○ | ○ | ○ | ○ | Hi(H) | Hi(H) | Hi(H) | Hi(H) | Lo(N) | Lo(N) |
| 82 | ○ | ○ | ○ | ○ | ○ | ○ | ○ | Lo(L) | Lo(L) | Lo(L) | Lo(L) | Hi(N) | Hi(N) |
| 83 | ● | ○ | ○ | ○ | ○ | ○ | ○ | Hi(H) | Hi(H) | Hi(H) | — | Hi(F) | Hi(F) |
| 84 | ● | ○ | ○ | ○ | ○ | ○ | ○ | Lo(L) | Lo(L) | Lo(L) | — | Lo(F) | Lo(F) |
| 85 | ○ | ● | ○ | ○ | ○ | ○ | ○ | Hi(H) | Lo(L) | Lo(L) | Lo(L) | Hi(F) | Lo(N) |
| 86 | ○ | ● | ○ | ○ | ○ | ○ | ○ | Lo(L) | Lo(L) | Lo(L) | Lo(L) | Lo(F) | Lo(F) |
| 87 | ○ | ○ | ● | ○ | ○ | ○ | ○ | Hi(H) | Lo(L) | Lo(L) | Lo(L) | Hi(F) | Lo(F) |
| 88 | ○ | ○ | ● | ○ | ○ | ○ | ○ | Lo(L) | Lo(L) | Lo(L) | Lo(L) | Lo(F) | Lo(F) |
| 89 | ○ | ○ | ○ | ● | ○ | ○ | ○ | Hi(H) | Hi(H) | Hi(H) | Hi(H) | Hi(F) | Hi(F) |
| 90 | ○ | ○ | ○ | ● | ○ | ○ | ○ | Lo(L) | Hi(H) | Hi(H) | Hi(H) | Lo(F) | Hi(F) |
| 91 | ○ | ○ | ○ | ○ | ● | ○ | ○ | Hi(H) | Hi(H) | Hi(H) | Hi(H) | Hi(F) | Lo(N) |
| 92 | ○ | ○ | ○ | ○ | ● | ○ | ○ | Lo(L) | Lo(L) | Lo(L) | Lo(L) | Lo(F) | Lo(N) |
| 93 | ○ | ○ | ○ | ○ | ○ | ● | ○ | Hi(H) | Hi(H) | Hi(H) | Hi(H) | Hi(F) | Lo(F) |
| 94 | ○ | ○ | ○ | ○ | ○ | ● | ○ | Lo(L) | Lo(L) | Lo(L) | Lo(L) | Lo(F) | Lo(F) |
| 95 | ○ | ○ | ○ | ○ | ○ | ○ | ● | Hi(H) | Hi(H) | Hi(H) | Hi(H) | Hi(F) | Hi(F) |
| 96 | ○ | ○ | ○ | ○ | ○ | ○ | ● | Lo(L) | Lo(L) | Lo(L) | Lo(L) | Lo(F) | Hi(N) |

(H:HIGH SPEED, L:LOW SPEED, N:NORMAL, F:FAULT)

FIG. 13

| CONDITION NO. | FAULT IN LOAD OR DRIVER ITSELF | PRESENCE/ABSENCE OF FAULT (○:NORMAL ●:FAULT) FAULT IN SIGNAL LINE | | | | | CONTROL SIGNAL OUTPUT FROM CONTROLLER | CONTROL SIGNAL INPUT INTO DRIVER | PROPER LOAD DRIVING | ACTUAL LOAD DRIVING | PROPER MONITOR SIGNAL REQUESTED BY CONTROLLER | ACTUAL MONITOR SIGNAL INPUT INTO CONTROLLER |
|---|---|---|---|---|---|---|---|---|---|---|---|---|
| | | CONTROL SIGNAL LINE | | MONITOR SIGNAL LINE | | | | | | | | |
| | | BROKEN | SHORT TO GROUND | SHORT TO SUPPLY | BROKEN | SHORT TO GROUND | SHORT TO SUPPLY | | | | | | |
| 97 | ○ | ○ | ○ | ○ | ○ | ○ | ○ | Hi(H) | Hi(H) | Hi(H) | Hi(H) | Lo(N) | Lo(N) |
| 98 | ○ | ○ | ○ | ○ | ○ | ○ | ○ | Lo(L) | Lo(L) | Lo(L) | Lo(L) | Hi(N) | Hi(N) |
| 99 | ● | ○ | ○ | ○ | ○ | ○ | ○ | Hi(H) | Hi(H) | Hi(H) | — | Hi(F) | Hi(F) |
| 100 | ● | ○ | ○ | ○ | ○ | ○ | ○ | Lo(L) | Lo(L) | Lo(L) | — | Lo(F) | Lo(F) |
| 101 | ○ | ● | ○ | ○ | ○ | ○ | ○ | Hi(H) | Lo(L) | Hi(H) | Lo(L) | Hi(F) | Hi(F) |
| 102 | ○ | ● | ○ | ○ | ○ | ○ | ○ | Lo(L) | Lo(L) | Lo(L) | Lo(L) | Hi(F) | Hi(N) |
| 103 | ○ | ○ | ● | ○ | ○ | ○ | ○ | Hi(H) | Lo(L) | Hi(H) | Lo(L) | Hi(F) | Hi(F) |
| 104 | ○ | ○ | ● | ○ | ○ | ○ | ○ | Lo(L) | Lo(L) | Lo(L) | Lo(L) | Hi(F) | Hi(N) |
| 105 | ○ | ○ | ○ | ● | ○ | ○ | ○ | Hi(H) | Hi(H) | Hi(H) | Hi(H) | Hi(F) | Hi(F) |
| 106 | ○ | ○ | ○ | ● | ○ | ○ | ○ | Lo(L) | Hi(H) | Lo(L) | Hi(H) | Lo(F) | Lo(F) |
| 107 | ○ | ○ | ○ | ○ | ● | ○ | ○ | Hi(H) | Hi(H) | Hi(H) | Hi(H) | Hi(F) | Hi(F) |
| 108 | ○ | ○ | ○ | ○ | ● | ○ | ○ | Lo(L) | Lo(L) | Lo(L) | Lo(L) | Lo(F) | Lo(N) |
| 109 | ○ | ○ | ○ | ○ | ○ | ● | ○ | Hi(H) | Hi(H) | Hi(H) | Hi(H) | Hi(F) | Lo(N) |
| 110 | ○ | ○ | ○ | ○ | ○ | ● | ○ | Lo(L) | Lo(L) | Lo(L) | Lo(L) | Lo(F) | Lo(F) |
| 111 | ○ | ○ | ○ | ○ | ○ | ○ | ● | Hi(H) | Hi(H) | Hi(H) | Hi(H) | Hi(F) | Hi(F) |
| 112 | ○ | ○ | ○ | ○ | ○ | ○ | ● | Lo(L) | Lo(L) | Lo(L) | Lo(L) | Lo(F) | Hi(N) |

(H:HIGH SPEED, L:LOW SPEED, N:NORMAL, F:FAULT)

FIG. 14

| CONDITION NO. | PRESENCE/ABSENCE OF FAULT (○:NORMAL ●:FAULT) | | | | | CONTROL SIGNAL OUTPUT FROM CONTROLLER | CONTROL SIGNAL INPUT INTO DRIVER | PROPER LOAD DRIVING | ACTUAL LOAD DRIVING | PROPER MONITOR SIGNAL REQUESTED BY CONTROLLER | ACTUAL MONITOR SIGNAL INPUT INTO CONTROLLER |
|---|---|---|---|---|---|---|---|---|---|---|---|
| | FAULT IN LOAD OR DRIVER ITSELF | FAULT IN SIGNAL LINE | | | | | | | | | |
| | | CONTROL SIGNAL LINE | | MONITOR SIGNAL LINE | | | | | | | |
| | | BROKEN | SHORT TO GROUND | SHORT TO SUPPLY | BROKEN | SHORT TO GROUND | SHORT TO SUPPLY | | | | | | |
| 113 | ○ | ○ | ○ | ○ | ○ | ○ | ○ | Hi(H) | Hi(H) | Hi(H) | Hi(H) | Lo(N) | Lo(N) |
| 114 | ○ | ○ | ○ | ○ | ○ | ○ | ○ | Lo(L) | Lo(L) | Lo(L) | Lo(L) | Hi(N) | Hi(N) |
| 115 | ● | ○ | ○ | ○ | ○ | ○ | ○ | Hi(H) | Hi(H) | Hi(H) | — | Hi(F) | Hi(F) |
| 116 | ● | ○ | ○ | ○ | ○ | ○ | ○ | Lo(L) | Lo(L) | Lo(L) | — | Lo(F) | Lo(F) |
| 117 | ○ | ● | ○ | ○ | ○ | ○ | ○ | Hi(H) | Hi(H) | Hi(H) | Hi(H) | Hi(F) | Lo(N) |
| 118 | ○ | ● | ○ | ○ | ○ | ○ | ○ | Lo(L) | Lo(L) | Lo(L) | Lo(L) | Lo(F) | Lo(F) |
| 119 | ○ | ○ | ● | ○ | ○ | ○ | ○ | Hi(H) | Lo(L) | Hi(H) | Hi(H) | Hi(F) | Hi(F) |
| 120 | ○ | ○ | ● | ○ | ○ | ○ | ○ | Lo(L) | Lo(L) | Lo(L) | Lo(L) | Lo(F) | Lo(F) |
| 121 | ○ | ○ | ○ | ● | ○ | ○ | ○ | Hi(H) | Hi(H) | Hi(H) | Hi(H) | Hi(F) | Hi(N) |
| 122 | ○ | ○ | ○ | ● | ○ | ○ | ○ | Lo(L) | Hi(H) | Lo(L) | Hi(H) | Lo(F) | Lo(N) |
| 123 | ○ | ○ | ○ | ○ | ● | ○ | ○ | Hi(H) | Hi(H) | Hi(H) | Hi(H) | Hi(F) | Lo(F) |
| 124 | ○ | ○ | ○ | ○ | ● | ○ | ○ | Lo(L) | Lo(L) | Lo(L) | Lo(L) | Lo(F) | Lo(F) |
| 125 | ○ | ○ | ○ | ○ | ○ | ● | ○ | Hi(H) | Hi(H) | Hi(H) | Hi(H) | Hi(F) | Lo(N) |
| 126 | ○ | ○ | ○ | ○ | ○ | ● | ○ | Lo(L) | Lo(L) | Lo(L) | Lo(L) | Lo(F) | Lo(F) |
| 127 | ○ | ○ | ○ | ○ | ○ | ○ | ● | Hi(H) | Hi(H) | Hi(H) | Hi(H) | Hi(F) | Hi(F) |
| 128 | ○ | ○ | ○ | ○ | ○ | ○ | ● | Lo(L) | Lo(L) | Lo(L) | Lo(L) | Lo(F) | Hi(N) |

(H:HIGH SPEED, L:LOW SPEED, N:NORMAL, F:FAULT)

FAULT DIAGNOSIS SYSTEM IN LOAD DRIVING ARRANGEMENT AND FUEL PUMP CONTROL SYSTEM

TECHNICAL FIELD

The present invention relates to a fault diagnosis system in a load driving arrangement to detect a fault in the load driving arrangement that drives a load by a driver and a fuel pump control system using same.

BACKGROUND ART

In a load driving arrangement that drives a load (for example, a motor, solenoid, etc.) based on a control signal from a controller, a fault diagnosis system using a driver that is provided with a self-diagnosis function to detect a fault in the load driving arrangement has recently been put into practical use.

Such fault diagnosis system is, for example, comprised of a load (e.g., a motor) 111, a driver 112 for driving the load 111, and a controller (e.g., an engine ECU) 113 which controls the driving of the load 111, as is shown in FIG. 20. This system is arranged such that a Hi (High) level control signal is sent from the controller 113 to the driver 112 when it is desired to drive the load 111 at a high speed, a Lo (Low) level control signal is sent from the controller 113 to the driver 112 when it is desired to drive the load 111 at a low speed, and the driver 112 drives the load 111 at a high or low speed, based on the corresponding signal.

Then, if there is not fault in the load 111 and the driver 112, the driver 112 returns a Hi level monitor signal to the controller 113, and if there is a fault, the driver 112 returns a Lo level monitor signal to the controller 113. The controller 113 is adapted to perform fault diagnosis of the load 111 and the driver 112 according to the monitor signal.

This fault diagnosis system is applied to, particularly, e.g., a fuel pump control system of a vehicle. In this application, the load 111 is a fuel pump (pump motor), the driver 112 is a fuel pump controller, and the controller 113 is an engine ECU.

DISCLOSURE OF INVENTION

Problems to be Solved by the Invention

However, it tuned out that the above fault diagnosis system in a load driving arrangement of prior might become unable to perform exact fault diagnosis. For example, if breaking of a control signal line 114 occurs, then the driver 112 becomes unable to properly recognize a control signal output from the controller 113 and misinterprets it as an indefinite signal or a signal fixed to Hi or Low level. For instance, in a case where the driver is configured as a circuit having a pull-down input terminal, as is shown in FIG. 21, the driver 112 will misinterpret a control signal as a Lo level signal. Consequently, while a Hi level signal is output from the controller 113, but the load 111 is driven at a low speed without regard to the control signal from the controller 113. At this time, as the driver 112 does not detect a fault, it returns a Hi level (normal) signal to the controller 113 as a monitor signal, and, therefore, it is impossible for the controller 113 to perform exact fault diagnosis.

For the above fault diagnosis system in a load driving arrangement of prior art, as noted above, even if the load is driven contradictorily to a command of the controller 113 (what is signaled by a control signal), it would be impossible to detect this as a fault. Failure to detect a fault like this occurs as well in case where the control signal line 114 is shorted to ground (short to ground) or shorted to a supply voltage (short to supply), in addition to its breaking. The same problem occurs as well in case a monitor signal line 115 is broken, shorted to ground (short to ground) or shorted to a supply voltage (short to supply). Thus, there emerged a problem that the above fault detection system is unable to detect a fault in the control signal line 114 and the monitor signal line.

In the application of such fault diagnosis system to a fuel pump control system of a vehicle, in case a fault occurs in the control signal line 114 and the monitor signal line 115, exact fault diagnosis of the fuel pump 111 and the fuel pump controller 112 becomes impossible. For this reason, there is a need to reduce the probability of a fault occurring in the control signal line 114 and the monitor signal line 115 in order to carry out exact fault diagnosis.

A conceivable way to reduce the probability of a signal line fault occurring is locating the fuel pump controller 112 near the engine ECU 113 (near the engine mounting position generally in the front part of the vehicle), as is shown in FIG. 22. However, this posed a problem that it is difficult to provide a space for mounting the fuel pump controller 112 in such a position on the vehicle.

Then, it is conceivable to locate the fuel pump controller 112 near the fuel pump 111 on the far side from the engine ECU (in the rear part of the vehicle), where there is little restriction for mounting the fuel pump controller 112 in such a position on the vehicle, as is shown in FIG. 23. In this case, the distance between the engine ECU 113 and the fuel pump controller 112 becomes larger and the control signal line 114 and the monitor signal line 115 become longer. Thus, in order to reduce the possibility of a fault occurring in the control signal line 114 and the monitor signal line 115, measures had to be taken such as thickening the covering of the signal lines, using the signal lines having larger diameter cores, and using high-quality connectors to minimize the possibility of contact failure. However, a drawback associated with the signal lines made tougher by the above measures is that they are very costly and have increased weight.

Technically, one object of the present invention is to provide a fault diagnosis system in a load driving arrangement that is able to detect a fault in the load and the driver as well as a fault in the control signal line and the monitor signal line. Technically, another object of the present invention is to provide a fuel pump control system that is adapted to be able to detect a fault in the fuel pump and the fuel pump controller as well as a fault in the control signal line and the monitor signal line, thus making it possible to locate the fuel pump controller near the fuel pump without using costly signal lines.

Means for Solving the Problems

To achieve the above object, the present invention provides a fault diagnosis system in a load driving arrangement, the fault diagnosis system detecting a fault in the load driving arrangement in which a controller outputs a control signal to a driver and the driver drives a load according to the control signal, the fault diagnosis system comprising: a fault detecting means which outputs, as a monitor signal, a signal opposite to the control signal upon detecting a fault in the load driving arrangement and outputs, as a monitor signal, the same signal as the control signal when not detecting a fault in the load driving arrangement, wherein the controller takes an input of the monitor signal output from the fault detecting means, compares the control signal and the monitor signal, and diagnoses whether a fault occurs in the load driving arrangement, based on the result of the comparison.

In the fault diagnosis system in the load driving arrangement relevant to the present invention, preferably, the fault detecting means may comprise a load/driver fault detecting unit which detects a fault in at least either the load or the driver itself and outputs its detection result as a detection signal and an exclusive OR circuit which outputs the XOR of the control signal input to the driver and the detection signal output from the load/driver fault detecting unit, wherein the controller may take an input of a signal output from the exclusive OR circuit as the monitor signal.

In the fault diagnosis system in the load driving arrangement relevant to the present invention, preferably, the controller may make a diagnosis that a fault occurs in the load driving arrangement, if there is a mismatch between the control signal and the monitor signal.

In this fault diagnosis system, a monitor signal output from the fault detecting means is input to the controller and the controller performs a fault diagnosis of the load driving arrangement, based on the monitor signal. Here, the fault detecting means is provided with the load/driver fault detecting unit which detects a fault in at least either the load or the driver itself and outputs its detection result as a detection signal and an exclusive OR circuit which outputs the XOR of the control signal input to the driver and the detection signal output from the load/driver fault detecting unit, thereby enabling outputting, as a monitor signal, a signal opposite to the control signal upon detecting a fault in the load driving arrangement and outputting, as a monitor signal, the same signal as the control signal when not detecting a fault in the load driving arrangement.

Fault occurrence in the load driving arrangement includes a case where trouble occurs with the driving of the load (the load is driven in contradiction to a command) due to a fault in a control signal line or a monitor signal line, besides a fault in the load or the driver itself.

The controller makes a diagnosis that a fault occurs in the load driving arrangement, if there is a mismatch between the control signal output by the controller itself and the monitor signal output from the fault detecting means.

By this arrangement, this fault diagnosis system is able to positively detect a fault in the load and the driver. Also, the system is able to positively detect a fault in the control signal line or the monitor signal line, causing trouble with the driving of the load (driving the load in contradiction to a command).

To achieve the above object, according to another aspect, the present invention provides a fault diagnosis system in a load driving arrangement, the fault diagnosis system detecting a fault in the load driving arrangement in which a controller outputs a control signal to a driver and the driver drives a load according to the control signal, the fault diagnosis system comprising: a fault detecting means which outputs, as a monitor signal, the same signal as the control signal upon detecting a fault in the load driving arrangement and outputs, as a monitor signal, a signal opposite to the control signal when not detecting a fault in the load driving arrangement, wherein the controller takes an input of the monitor signal output from the fault detecting means and diagnoses whether a fault occurs in the load driving arrangement, based on the monitor signal.

In the above fault diagnosis system, preferably, the fault detecting means comprises: a load/driver fault detecting unit which detects a fault in at least either the load or the driver itself and outputs its detection result as a detection signal; and an exclusive OR circuit which outputs the XOR of the control signal input to the driver and the detection signal output from the load/driver fault detecting unit, wherein the controller takes an input of a signal output from the exclusive OR circuit as the monitor signal.

In the above fault diagnosis system, preferably, the controller makes a diagnosis that a fault occurs in the load driving arrangement, when there is a mismatch between the control signal and the monitor signal.

In this fault diagnosis system, a monitor signal output from the fault detecting means is input to the controller and the controller performs a fault diagnosis of the load driving arrangement, based on the monitor signal. Here, the fault detecting means is provided with the load/driver fault detecting unit which detects a fault in at least either the load or the driver itself and outputs its detection result as a detection signal and an exclusive NOT OR circuit which outputs the XNOR of the control signal input to the driver and the detection signal output from the load/driver fault detecting unit, thereby enabling outputting, as a monitor signal, the same signal as the control signal upon detecting a fault in the load driving arrangement and outputting, as a monitor signal, a signal opposite to the control signal when not detecting a fault in the load driving arrangement.

Fault occurrence in the load driving arrangement includes the case where trouble occurs with the driving of the load (the load is driven in contradiction to a command) due to a fault in the control signal line or the monitor signal line, besides a fault in the load or the driver itself.

The controller makes a diagnosis that a fault occurs in the load driving arrangement, if there is a match between the control signal output by the controller itself and the monitor signal output from the fault detecting means.

By this arrangement, this fault diagnosis system is able to positively detect a fault in the load and the driver. Also, the system is able to positively detect a fault in the control signal line or the monitor signal line, causing trouble with the driving of the load (driving the load in contradiction to a command).

To achieve the above object, according to another aspect, the present invention provides A fuel pump control system comprising an engine ECU, a fuel pump, and a fuel pump controller which controls the fuel pump according to a command from the engine ECU, wherein: one of the aforementioned fault diagnosis systems is realized such that the engine ECU, the fuel pump controller, and the fuel pump correspond to the controller, the driver, and the load, respectively, in the fault diagnosis system.

In this case, it is desirable that the engine ECU is located in either the front part or the rear part of a vehicle and the fuel pump controller is located on the far side from the engine ECU. That is, if the engine ECU is located in the front part of a vehicle, the fuel pump controller should be located in the rear part of the vehicle. If the engine ECU is located in the rear part of a vehicle, the fuel pump controller should be located in the front part of the vehicle.

Owing to the realization of any one of the above-described fault diagnosis systems in this fuel pump control system, it is possible to positively detect a fault in the fuel pump and the fuel pump controller as well as to positively detect a fault in the control signal line or the monitor signal line, causing trouble with the driving of the fuel pump (driving it in contradiction to a command). Consequently, there is no need to reduce the probability of a fault occurring in the control signal line and the monitor signal line. It is thus possible to locate the fuel pump controller on the far side from the engine ECU (locate the fuel pump controller near the fuel pump) without using costly signal lines. Thus, the flexibility of design of mounting the fuel pump controller is improved. This system is advantageous in terms of cost and weight, because there is no need to take measures such as thickening the covering of the signal lines, using the signal lines having larger diameter cores, and using high-quality connectors to minimize the possibility of contact failure.

To achieve the above object, according to another aspect, the present invention provides A fuel pump control system comprising an engine ECU, a fuel pump, and a fuel pump controller which controls the fuel pump according to a command from the engine ECU, wherein: one of the aforementioned fault diagnosis systems is realized such that the engine ECU, the fuel pump controller, and the fuel pump correspond to the controller, the driver, and the load, respectively, in the fault diagnosis system; and the fuel pump controller is combined with the fuel pump, thus forming a fuel pump module integral with its controller.

In this case, it is desirable that the engine ECU is located in either the front part or the rear part of a vehicle and the fuel pump module integral with its controller is located on the far side from the engine ECU. That is, if the engine ECU is located in the front part of a vehicle, the fuel pump module should be located in the rear part of the vehicle. If the engine ECU is located in the rear part of a vehicle, the fuel pump module should be located in the front part of the vehicle.

In this fuel pump control system as well, owing to the realization of any one of the above-described fault diagnosis systems, it is possible to positively detect a fault in the fuel pump and the fuel pump controller as well as to positively detect a fault in the control signal line or the monitor signal line, causing trouble with the driving of the fuel pump (driving it in contradiction to a command). Consequently, there is no need to reduce the probability of a fault occurring in the control signal line and the monitor signal line. It is thus possible to locate the fuel pump controller on the far side from the engine ECU (locate the fuel pump controller near the fuel pump) without using costly signal lines. Thus, the flexibility of design of mounting the fuel pump controller is improved. This system is advantageous in terms of cost and weight, because there is no need to take measures such as thickening the covering of the signal lines, using the signal lines having larger diameter cores, and using high-quality connectors to minimize the possibility of contact failure.

Furthermore, in this fuel pump control system, the fuel pump controller is combined with the fuel pump, thus forming the fuel pump module integral with its controller. Owing to this, the length of wiring between the fuel pump controller and the fuel pump can be shortened (to the shortest possible) as compared with the system in which the fuel pump controller and the fuel pump are separate components. The amount of work necessary for assembly into the vehicle can be reduced and downsizing of the fuel pump control system can be pursued.

In the fuel pump control system of another aspect, preferably, the fuel pump controller is integrally installed on a plate member for mounting the fuel pump in a fuel tank.

Also, preferably, wiring between the fuel pump controller and the fuel pump is performed by means of bus bars, wiring patterns, or copper wires and the wiring is insert molded into a resin member integrated into the plate member.

By doing the above, the fuel pump and the fuel pump controller can be housed in a common housing (commoditizing) and cost reduction can be pursued by reducing the number of parts.

BRIEF DESCRIPTION OF DRAWINGS

FIG. 3 tabulates operation aspects of the fault diagnosis system relevant to the first embodiment;

FIG. 5 tabulates operation aspects of the fault diagnosis system relevant to the second embodiment;

FIG. 7 tabulates operation aspects of the fault diagnosis system relevant to the third embodiment;

FIG. 9 tabulates operation aspects of the fault diagnosis system relevant to the fourth embodiment;

FIG. 11 tabulates operation aspects of the fault diagnosis system relevant to the fifth embodiment;

FIG. 12 tabulates operation aspects of a fault diagnosis system relevant to a sixth embodiment;

FIG. 13 tabulates operation aspects of a fault diagnosis system relevant to a seventh embodiment;

FIG. 14 tabulates operation aspects of a fault diagnosis system relevant to an eighth embodiment;

BEST MODE FOR CARRYING OUT THE INVENTION

<First Embodiment>

In the following, preferred embodiments in which the fault diagnosis system in a load driving arrangement of the present invention is embodied for illustrative purposes.

Figure 1:
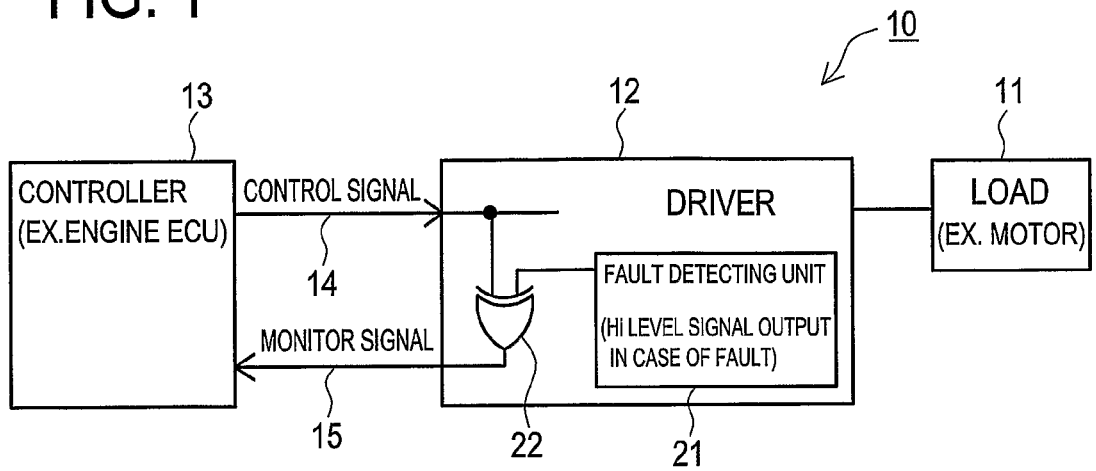
FIG. 1 is a block diagram showing a configuration of a fault diagnosis system in a load driving arrangement relevant to a first embodiment of the invention.
Figure 2:
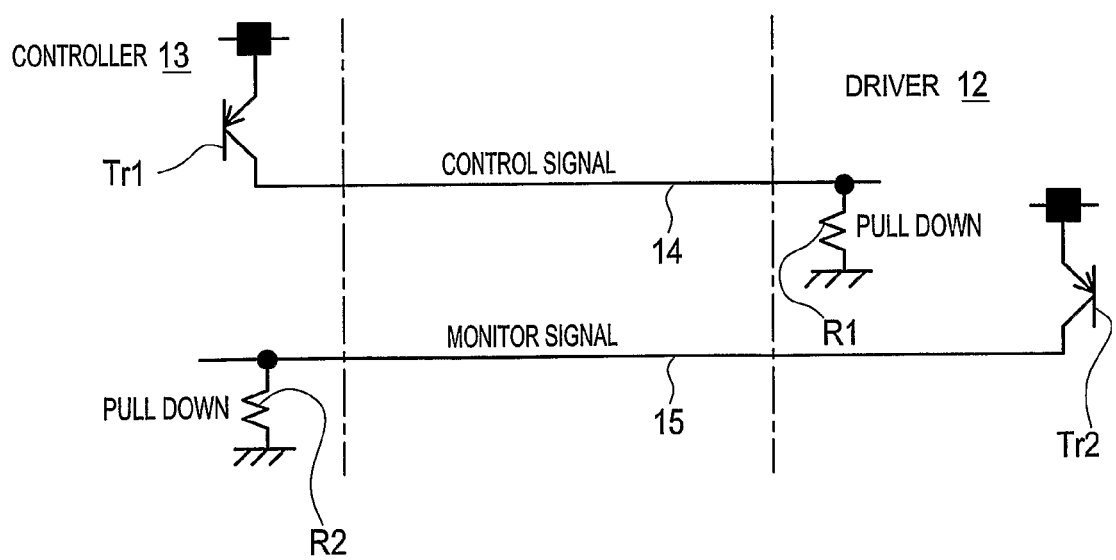
FIG. 2 is a diagram showing the input/output circuits of a controller and a driver in the fault diagnosis system in the load driving arrangement relevant to the first (fourth) embodiment.

First, a fault diagnosis system in a load driving arrangement relevant to a first embodiment is described with reference to FIG. 1 and FIG. 2. FIG. 1 is a block diagram showing a configuration of a fault diagnosis system in a load driving arrangement relevant to the first embodiment of the invention. FIG. 2 is a diagram showing the input/output circuits of a controller and a driver.

The fault diagnosis system 10 in the load driving arrangement relevant to the present embodiment is comprised of a load (e.g., a motor) 11, a driver 12 for driving the load 11, and a controller (e.g., an engine ECU) 13 which controls the driving of the load 11, as shown in FIG. 1. Between the driver 12 and the controller 13, a control signal line 14 which carries a control signal from the controller 13 to the driver 12 and a monitor signal line 15 which carries a monitor signal from the driver 12 to the controller 13 are provided.

The driver 12 is provided with a fault detecting unit 21 that detects a fault in the load 11 and the driver itself and outputs its detection result as a detection signal. This fault detecting unit 21 is arranged to output a Hi/Lo level signal as the detection signal depending on the presence/absence of a fault in the load 11 and the driver 12 itself. In the preset embodiment, the fault detecting unit 21 is arranged to output a Hi level signal upon detecting a fault.

The driver 12 is also provided with an exclusive OR circuit 22. To this exclusive OR circuit 22, a control signal input to the driver 12 and a detection signal output from the fault detecting unit 21 are discretely input, and the XOR of these signals is output as a monitor signal from the exclusive OR circuit 22.

Here, the input/output circuits of the controller 13 and the driver 12 are configured such that both the control signal and the monitor signal are input as pulled-down inputs, as shown in FIG. 2. Specifically, a PNP type transistor Tr1 is connected to the controller 13 end of the control signal line 14 and a grounded pull-down resistor R1 is connected to the driver 12 end of this line. On the other hand, a PNP type transistor Tr2 is connected to the driver 12 (fault detecting unit 21) end of the monitor signal line 15 and a grounded pull-down resistor R2 is connected to the controller 13 end of this line.

This arrangement enables the controller 13 to output a Hi level signal (high-speed drive signal) to the driver 12 by turning the transistor Tr1 on and output a Lo level signal (low-speed drive signal) by turning the transistor Tr1 off. On the other hand, this arrangement enables the driver 12 to output a Hi level signal to the controller 13 by turning the transistor Tr2 on and output a Lo level signal by turning the transistor Tr2 off.

Although an actual monitor signal is the XOR of a control signal input to the driver 12 and a detection signal output from the fault detecting unit 21, which is output as a monitor signal, the exclusive OR portion is not shown for simplification in FIG. 2 to simplify explanation.

In the thus configured fault diagnosis system 10, from the controller 13, a control signal (Hi level signal/Lo level signal) to drive the load 11 is output and this signal is input to the driver 12. Then, the driver 12 drives the load 11 according to the control signal. At this time, if a fault is detected in the load 11 and the driver 12, a Hi level detection signal is output from the fault detecting unit 21.

The control signal input to the driver 12 and the detection signal output from the fault detecting unit 21 are input to the exclusive OR circuit 22 and the XOR signal of these signals is output as a monitor signal from the driver 12 to the controller 13. This arrangement enables the driver 12 to output the same signal as the control signal as a monitor signal when there is no fault in the load driving arrangement and output a signal opposite to the control signal as a monitor signal in the event of a fault occurring in the load driving arrangement.

This arrangement enables the controller 13 to detect a fault in the load 11 and the driver 12 as well as a fault in the control signal line 14 and the monitor signal line 15 by determining whether or not there is a match between the control signal and the monitor signal. That is, the controller 13 can diagnose it as abnormal by a mismatch between the control signal and the monitor signal and diagnose it as normal by a match between the control signal and the monitor signal.

In the following, the operation of the fault diagnosis system 10 is described for each of different fault occurrence situations with reference to FIG. 3. FIG. 3 tabulates operation aspects of the fault diagnosis system relevant to the first embodiment.

First, an aspect of the operation, when there is no fault in the load driving arrangement (Conditions 1, 2), is described. For high-speed driving of the load 11, the controller 13 outputs a Hi level signal by turning the transistor Tr1 on. Then, the Hi level signal is input to the driver 12. In consequence, the load 11 is driven at a high speed as commanded. At this time, since there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. Then, this Hi level monitor signal is input to the controller 13. At this time, because of a match between the monitor signal (Hi) and the control signal (Hi), the controller 13 diagnoses it as normal.

For low-speed driving of the load 11, the controller 13 outputs a Lo level signal by turning the transistor Tr1 off. Then, the Lo level signal is input to the driver 12. Thereby, the load 11 is driven at a low speed as commanded. At this time, since there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. Then, this Lo level monitor signal is input to the controller 13. At this time, because of a match between the monitor signal (Lo) and the control signal (Lo), the controller 13 diagnoses it as normal.

Next, another aspect of the operation in the event of a fault occurring in the load 11 or the driver (Conditions 3, 4) is described. Typical faults in the load 11 are, for example, short circuit, broken wire, etc. Typical faults in the driver 12 are overheat, overcurrent, etc.

For high-speed driving of the load 11, the controller 13 outputs a Hi level signal by turning the transistor Tr1 on. Then, the Hi level signal is input to the driver 12. However, because a fault is detected by the fault detecting unit 21, the load 11 is regulated by a predetermined action (for example, stop the driving) as specified by product specifications. In the present embodiment, the driving of the load 11 is stopped. At this time, the fault detecting unit 21 outputs a Hi level signal. As a result, the Hi level control signal and the Hi level detection signal are input to the exclusive OR circuit 22 and, therefore, as a monitor signal, a Lo level signal is output from the exclusive OR circuit 22. This Lo level monitor signal is input to the controller 13. At this time, because of a mismatch between the monitor signal (Lo) and the control signal (Hi), the controller 13 diagnoses it as abnormal.

For low-speed driving of the load 11, the controller 13 outputs a Lo level signal by turning the transistor Tr1 off. Then, the Lo level signal is input to the driver 12. However, the driving of the load 11 is stopped because of a fault in the load 11 or the driver 12. At this time, the fault detecting unit 21 outputs a Hi level signal. As a result, the Lo level control signal and the Hi level detection signal are input to the exclusive OR circuit 22 and, therefore, as a monitor signal, a Hi level signal is output from the exclusive OR circuit 22. This Hi level monitor signal is input to the controller 13. At this time, because of a mismatch between the monitor signal (Hi) and the control signal (Lo), the controller 13 diagnoses it as abnormal.

In the fault diagnosis system 10, in this way, the controller 13 can recognize a fault that occurs in the load 11 or the driver 12.

Next, another aspect of the operation in the event that the control signal line 14 is broken (Conditions 5, 6) is described.

For high-speed driving of the load 11, the controller 13 outputs a Hi level signal by turning the transistor Tr1 on. However, because the control signal line 14 is broken, a Lo level signal is input to the driver 12 because of the pulled-down input of the control signal. In consequence, the load 11 is driven at a low speed in contradiction to the command. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. This Lo level monitor signal is input to the controller 13. At this time, because of a mismatch between the monitor signal (Lo) and the control signal (Hi), the controller 13 diagnoses it as abnormal.

For low-speed driving of the load 11, the controller 13 outputs a Lo level signal by turning the transistor Tr1 off. Here, because the control signal line 14 is broken, a Lo level signal is input to the driver 12 because of the pulled-down input of the control signal. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. This Lo level monitor signal is input to the controller 13. At this time, because of a match between the monitor signal (Lo) and the control signal (Lo), the controller 13 diagnoses it as normal.

Although the breaking of the control signal line 14 cannot be detected for Condition 6, as above, the load 11 is driven at a low speed as commanded and no trouble occurs with the driving of the load 11. Because the control signal toggles between Hi and Lo levels, the breaking of the control signal line 14 can be detected when the controller outputs a signal for high-speed driving of the load 11. Thus, in the fault diagnosis system 10, the controller 13 can recognize a fault as the breaking of the control signal line 14.

Next, another aspect of the operation in the event that the control signal line 14 is shorted to ground (short to ground) (Conditions 7, 8) is described.

For high-speed driving of the load 11, the controller 13 outputs a Hi level signal by turning the transistor Tr1 on. However, because the control signal line 14 is shorted to ground, a Lo level control signal is input to the driver 12. In consequence, the load 11 is driven at a low speed in contraction to the command. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. This Lo level monitor signal is input to the controller 13. At this time, because of a mismatch between the monitor signal (Lo) and the control signal (Hi), the controller 13 diagnoses it as abnormal.

For low-speed driving of the load 11, the controller 13 outputs a Lo level signal by turning the transistor Tr1 off. Here, because the control signal line 14 is shorted to ground, a Lo level control signal is input to the driver 12. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive, OR circuit 22 and, therefore, as a monitor signal, a Lo level signal is output from the exclusive OR circuit 22. This Lo level monitor signal is input to the controller 13. At this time, because of a match between the monitor signal (Lo) and the control signal (Lo), the controller 13 diagnoses it as normal.

Although the short to ground of the control signal line 14 cannot be detected for Condition 8, as above, the load 11 is driven at a low speed as commanded and no trouble occurs with the driving of the load 11. Because the control signal toggles between Hi and Lo levels, the short to ground of the control signal line 14 can be detected when the controller outputs a signal for high-speed driving of the load 11. Thus, in the fault diagnosis system 10, the controller 13 can recognize a fault as the short to ground of the control signal line 14.

Next, another aspect of the operation in the event that the control signal line 14 is shorted to a supply voltage (short to supply) (Conditions 9, 10) is described.

For high-speed driving of the load 11, the controller 13 outputs a Hi level signal by turning the transistor Tr1 on. At this time, because the control signal line 14 is shorted to the supply voltage, a Hi level control signal is input to the driver 12. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. This Hi level monitor signal is input to the controller 13. At this time, because of a match between the monitor signal (Hi) and the control signal (Hi), the controller 13 diagnoses it as normal.

For low-speed driving of the load 11, the controller 13 outputs a Lo level signal by turning the transistor Tr1 off. However, because the control signal line 14 is shorted to the supply voltage, a Hi level control signal is input to the driver 12. In consequence, the load 11 is driven at a high speed in contradiction to the command. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. This Hi level monitor signal is input to the controller 13. At this time, because of a mismatch between the monitor signal (Hi) and the control signal (Lo), the controller 13 diagnoses it as abnormal.

Here, although the short to supply of the control signal line 14 cannot be detected for Condition 9, the load 11 is driven at a high speed as commanded and no trouble occurs with the driving of the load 11. Because the control signal toggles between Hi and Lo levels, the short to supply of the control signal line 14 can be detected when the controller outputs a signal for low-speed driving of the load 11. Thus, in the fault diagnosis system 10, the controller 13 can recognize a fault as the short to supply of the control signal line 14.

Next, another aspect of the operation in the event that the monitor signal line 15 is broken (Conditions 11, 12) is described.

For high-speed driving of the load 11, the controller 13 outputs a Hi level signal by turning the transistor Tr1 on. Then, the Hi level control signal is input to the driver 12. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. However, because the monitor signal line 15 is broken, a Lo level monitor signal is input to the controller 13 because of the pulled-down input of the monitor signal. Therefore, because of a mismatch between the monitor signal (Lo) and the control signal (Hi), the controller 13 diagnoses it as abnormal.

For low-speed driving of the load 11, the controller 13 outputs a Lo level signal by turning the transistor Tr1 off. Then, the Lo level control signal is input to the driver 12. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. Here, because the monitor signal line 15 is broken, a Lo level monitor signal is input to the controller 13 because of the pulled-down input of the monitor signal. Therefore, because of a match between the monitor signal (Lo) and the control signal (Lo), the controller 13 diagnoses it as normal.

Although the breaking of the monitor signal line 15 cannot be detected for Condition 12, as above, the load 11 is driven at a low speed as commanded and no trouble occurs with the driving of the load 11. Because the control signal toggles between Hi and Lo levels, the breaking of the monitor signal line 15 can be detected when the controller outputs a signal for high-speed driving of the load 11. Thus, in the fault diagnosis system 10, the controller 13 can recognize a fault as the breaking of the monitor signal line 15.

Next, another aspect of the operation in the event that the monitor signal line 15 is shorted to ground (short to ground) (Conditions 13, 14) is described.

For high-speed driving of the load 11, the controller 13 outputs a Hi level signal by turning the transistor Tr1 on. Then, the Hi level control signal is input to the driver 12. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. However, because the monitor signal line 15 is shorted to ground, a Lo level monitor signal is input to the controller 13. Therefore, because of a mismatch between the monitor signal (Lo) and the control signal (Hi), the controller 13 diagnoses it as abnormal.

For low-speed driving of the load 11, the controller 13 outputs a Lo level signal by turning the transistor Tr1 off. Then, the Lo level control signal is input to the driver 12. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. Here, because the monitor signal line 15 is shorted to ground, a Lo level monitor signal is input to the controller 13. Therefore, because of a match between the monitor signal (Lo) and the control signal (Lo), the controller 13 diagnoses it as normal.

Although the short to ground of the monitor signal line 15 cannot be detected for Condition 14, as above, the load 11 is driven at a low speed as commanded and no trouble occurs with the driving of the load 11. Because the control signal toggles between Hi and Lo levels, the short to ground of the monitor signal line 15 can be detected when the controller outputs a signal for high-speed driving of the load 11. Thus, in the fault diagnosis system 10, the controller 13 can recognize a fault as the short to ground of the monitor signal line 15.

Finally, another aspect of the operation in the event that the monitor signal line 15 is shorted to a supply voltage (short to supply) (Conditions 15, 16) is described.

For high-speed driving of the load 11, the controller 13 outputs a Hi level signal by turning the transistor Tr1 on. Then, the Hi level control signal is input to the driver 12. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. Here, because the monitor signal line 15 is shorted to the supply voltage, a Hi level monitor signal is input to the controller 13. Therefore, because of a match between the monitor signal (Hi) and the control signal (Hi), the controller 13 diagnoses it as normal.

For low-speed driving of the load 11, the controller 13 outputs a Lo level signal by turning the transistor Tr1 off. Then, the Lo level control signal is input to the driver 12. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. However, because the monitor signal line 15 is shorted to the supply voltage, a Hi level monitor signal is input to the controller 13. Therefore, because of a mismatch between the monitor signal (Hi) and the control signal (Lo), the controller 13 diagnoses it as abnormal.

Here, although the short to supply of the monitor signal line 15 cannot be detected for Condition 15, the load 11 is driven at a high speed as commanded and no trouble occurs with the driving of the load 11. Because the control signal toggles between Hi and Lo levels, the short to supply of the monitor signal line 15 can be detected when the controller outputs a signal for low-speed driving of the load 11. Thus, in the fault diagnosis system 10, the controller 13 can recognize a fault as the short to supply of the monitor signal line 15.

As noted above, according to the fault diagnosis system 10 relevant to the first embodiment, in the case where trouble occurs with the driving of the load 11, as there is a mismatch between proper (commanded) load driving and actual load driving (Conditions 3, 4, 5, 7, 10; shaded cells in FIG. 3), it is possible to positively detect that a fault occurs in the load driving arrangement. In the case where a fault (breaking, short to ground, or short to supply) occurs in the control signal line 14 or the monitor signal line 15 (Conditions 11 to 16), by the alternation of high-speed and low-speed driving of the load 11, while no trouble occurs with the driving itself of the load 11, it is possible to positively detect the fault in the control signal line 14 or the monitor signal line 15.

According to the fault diagnosis system 10, it is thus possible to detect a fault in the load 11 and the driver 12 as well as a fault in the control signal line 14 or the monitor signal line 15 by means of a very simple configuration.

<Second Embodiment>

Figure 4:
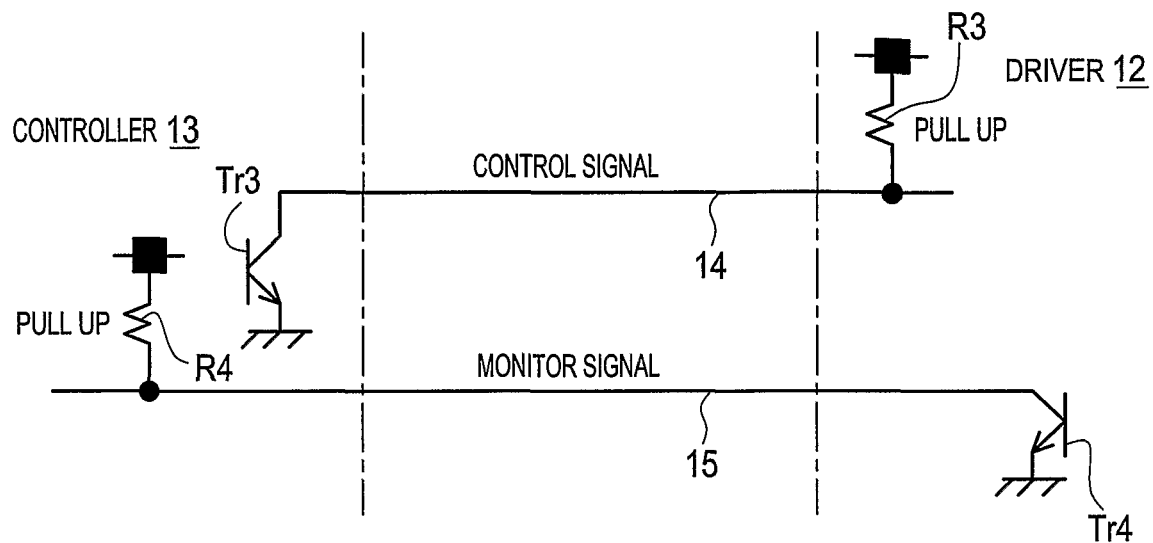
FIG. 4 is a diagram showing the input/output circuits of a controller and a driver in a fault diagnosis system in a load driving arrangement relevant to a second (sixth) embodiment.

Then, a second embodiment is described. The second embodiment differs from the first embodiment only in that the input/output circuits of the controller 13 and the driver 12 are configured differently. That is, these circuits are configured such that both the control signal and the monitor signal are input as pulled-up inputs, as is shown in FIG. 4. In particular, an NPN type transistor Tr3 is connected to the controller 13 end of the control signal line 14 and a pull-up resistor R3 connected to a supply voltage is connected to the driver 12 end of this line. On the other hand, an NPN type transistor Tr4 is connected to the driver 12 (fault detecting unit 21) end of the monitor signal line 15 and a pull-up resistor R4 connected to a supply voltage is connected to the controller 13 end of this line. FIG. 4 is a diagram showing the configuration of the input/output circuits of the controller 13 and the driver 12. The fault diagnosis system of the second embodiment is essentially the same as the first embodiment with the exception of the configuration of the input/output circuits of the controller 13 and the driver 12 and, therefore, the same reference numbers are assigned to the main components and duplicated description is omitted, where appropriate.

This arrangement of the input/output circuits enables the controller 13 to output a Hi level signal (high-speed drive signal) to the driver 12 by turning the transistor Tr3 off and output a Lo level signal (low-speed drive signal) by turning the transistor Tr3 on. On the other hand, this arrangement enables the driver 12 to output a Hi level signal to the controller 13 by turning the transistor Tr4 off and output a Lo level signal by turning the transistor Tr4 on.

Although an actual monitor signal is the XOR of a control signal input to the driver 12 and a detection signal output from the fault detecting unit 21, which is output as a monitor signal, the exclusive OR portion is not shown for simplification in FIG. 4 to simplify explanation.

In the following, the operation of the fault diagnosis system relevant to the second embodiment is described for each of different fault occurrence situations with reference to FIG. 5. FIG. 5 tabulates operation aspects of the fault diagnosis system relevant to the second embodiment.

First, the aspects of the operation when there is no fault in the load driving arrangement (Conditions 17, 18) and in the event that a fault occurs in the load 11 or the driver 12 (Conditions 19, 20) are the same as described for the first embodiment except that on-off switching of the transistors Tr3, Tr4 for outputting the control signal and the monitor signal is performed in a different way from operating the corresponding transistors in the first embodiment; therefore, the description of these aspects is omitted.

Next, an aspect of the operation in the event that the control signal line 14 is broken (Conditions 21, 22) is described.

For high-speed driving of the load 11, the controller 13 outputs a Hi level signal by turning the transistor Tr3 off. Here, because the control signal line 14 is broken, a Hi level control signal is input to the driver 12 because of the pulled-up input of the control signal. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. This Hi level monitor signal is input to the controller 13. At this time, because of a match between the monitor signal (Hi) and the control signal (Hi), the controller 13 diagnoses it as normal.

For low-speed driving of the load 11, the controller 13 outputs a Lo level signal by turning the transistor Tr3 on. However, because the control signal line 14 is broken, a Hi level control signal is input to the driver 12 because of the pulled-up input of the control signal. In consequence, the load 11 is driven at a high speed in contradiction to the command. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. This Hi level monitor signal is input to the controller 13. At this time, because of a mismatch between the monitor signal (Hi) and the control signal (Lo), the controller 13 diagnoses it as abnormal.

Here, although the breaking of the control signal line 14 cannot be detected for Condition 21, the load 11 is driven at a high speed as commanded and no trouble occurs with the driving of the load 11. Because the control signal toggles between Hi and Lo levels, the breaking of the control signal line 14 can be detected when the controller outputs a signal for low-speed driving of the load 11. Thus, in the fault diagnosis system relevant to the second embodiment, the controller 13 can recognize a fault as the breaking of the control signal line 14.

Next, another aspect of the operation in the event that the control signal line 14 is shorted to ground (short to ground) (Conditions 23, 24) is described.

For high-speed driving of the load 11, the controller 13 outputs a Hi level signal by turning the transistor Tr3 off. However, because the control signal line 14 is shorted to ground, a Lo level control signal is input to the driver 12. In consequence, the load 11 is driven at a low speed in contraction to the command. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. This Lo level monitor signal is input to the controller 13. At this time, because of a mismatch between the monitor signal (Lo) and the control signal (Hi), the controller 13 diagnoses it as abnormal.

For low-speed driving of the load 11, the controller 13 outputs a Lo level signal by turning the transistor Tr3 on. Here, because the control signal line 14 is shorted to ground, a Lo level control signal is input to the driver 12. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. This Lo level monitor signal is input to the controller 13. At this time, because of a match between the monitor signal (Lo) and the control signal (Lo), the controller 13 diagnoses it as normal.

Although the short to ground of the control signal line 14 cannot be detected for Condition 24, as above, the load 11 is driven at a low speed as commanded and no trouble occurs with the driving of the load 11. Because the control signal toggles between Hi and Lo levels, the short to ground of the control signal line 14 can be detected when the controller outputs a signal for high-speed driving of the load 11. Thus, in the fault diagnosis system relevant to the second embodiment, the controller 13 can recognize a fault as the short to ground of the control signal line 14.

Next, another aspect of the operation in the event that the control signal line 14 is shorted to a supply voltage (short to supply) (Conditions 25, 26) is described.

For high-speed driving of the load 11, the controller 13 outputs a Hi level signal by turning the transistor Tr3 off. At this time, because the control signal line 14 is shorted to the supply voltage, a Hi level control signal is input to the driver 12. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. This Hi level monitor signal is input to the controller 13. At this time, because of a match between the monitor signal (Hi) and the control signal (Hi), the controller 13 diagnoses it as normal.

For low-speed driving of the load 11, the controller 13 outputs a Lo level signal by turning the transistor Tr3 on. However, because the control signal line 14 is shorted to the supply voltage, a Hi level control signal is input to the driver 12. In consequence, the load 11 is driven at a high speed in contradiction to the command. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. This Hi level monitor signal is input to the controller 13. At this time, because of a mismatch between the monitor signal (Hi) and the control signal (Lo), the controller 13 diagnoses it as abnormal.

Here, although the short to supply of the control signal line 14 cannot be detected for Condition 25, the load 11 is driven at a high speed as commanded and no trouble occurs with the driving of the load 11. Because the control signal toggles between Hi and Lo levels, the short to supply of the control signal line 14 can be detected when the controller outputs a signal for low-speed driving of the load 11. Thus, in the fault diagnosis system relevant to the second embodiment, the controller 13 can recognize a fault as the short to supply of the control signal line 14.

Next, another aspect of the operation in the event that the monitor signal line 15 is broken (Conditions 27, 28) is described.

For high-speed driving of the load 11, the controller 13 outputs a Hi level signal by turning the transistor Tr3 off. Then, the Hi level control signal is input to the driver 12. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. Here, because the monitor signal line 15 is broken, a Hi level monitor signal is input to the controller 13 because of the pulled-up input of the monitor signal. Therefore, because of a match between the monitor signal (Hi) and the control signal (Hi), the controller 13 diagnoses it as normal.

For low-speed driving of the load 11, the controller 13 outputs a Lo level signal by turning the transistor Tr3 on. Then, the Lo level control signal is input to the driver 12. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. However, because the monitor signal line 15 is broken, a Hi level monitor signal is input to the controller 13 because of the pulled-up input of the monitor signal. Therefore, because of a mismatch between the monitor signal (Hi) and the control signal (Lo), the controller 13 diagnoses it as abnormal.

Here, although the breaking of the monitor signal line 15 cannot be detected for Condition 27, the load 11 is driven at a high speed as commanded and no trouble occurs with the driving of the load 11. Because the control signal toggles between Hi and Lo levels, the breaking of the monitor signal line 15 can be detected when the controller outputs a signal for low-speed driving of the load 11. Thus, in the fault diagnosis system relevant to the second embodiment, the controller 13 can recognize a fault as the breaking of the monitor signal line 15.

Next, another aspect of the operation in the event that the monitor signal line 15 is shorted to ground (short to ground) (Conditions 29, 30) is described.

For high-speed driving of the load 11, the controller 13 outputs a Hi level signal by turning the transistor Tr3 off. Then, the Hi level control signal is input to the driver 12. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. However, because the monitor signal line 15 is shorted to ground, a Lo level monitor signal is input to the controller 13. Therefore, because of a mismatch between the monitor signal (Lo) and the control signal (Hi), the controller 13 diagnoses it as abnormal.

For low-speed driving of the load 11, the controller 13 outputs a Lo level signal by turning the transistor Tr3 on. Then, the Lo level control signal is input to the driver 12. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. Here, because the monitor signal line 15 is shorted to ground, a Lo level monitor signal is input to the controller 13. Therefore, because of a match between the monitor signal (Lo) and the control signal (Lo), the controller 13 diagnoses it as normal.

Although the short to ground of the monitor signal line 15 cannot be detected for Condition 30, as above, the load 11 is driven at a low speed as commanded and no trouble occurs with the driving of the load 11. Because the control signal toggles between Hi and Lo levels, the short to ground of the monitor signal line 15 can be detected when the controller outputs a signal for high-speed driving of the load 11. Thus, in the fault diagnosis system relevant to the second embodiment, the controller 13 can recognize a fault as the short to ground of the monitor signal line 15.

Finally, another aspect of the operation in the event that the monitor signal line 15 is shorted to a supply voltage (short to supply) (Conditions 31, 32) is described.

For high-speed driving of the load 11, the controller 13 outputs a Hi level signal by turning the transistor Tr3 off. Then, the Hi level control signal is input to the driver 12. In consequence, the load 11 is driven at a high speed as commanded. At this time, because there is no fault in the load 11 and the driver 12, the fault detecting unit 21 outputs a Lo level signal. As a result, the Hi level control signal and the Lo level detection signal are input to the exclusive OR circuit 22 and, therefore, as a monitor signal, a Hi level signal is output from the exclusive OR circuit 22. Here, because the monitor signal line 15 is shorted to the supply voltage, a Hi level monitor signal is input to the controller 13. Therefore, because of a match between the monitor signal (Hi) and the control signal (Hi), the controller 13 diagnoses it as normal.

For low-speed driving of the load 11, the controller 13 outputs a Lo level signal by turning the transistor Tr3 on. Then, the Lo level control signal is input to the driver 12. In consequence, the load 11 is driven at a low speed as commanded. At this time, because there is no fault in the load 11 and the driver 12, the fault detecting unit 21 outputs a Lo level signal. As a result, the Lo level control signal and the Lo level detection signal are input to the exclusive OR circuit 22 and, therefore, as a monitor signal, a Lo level signal is output from the exclusive OR circuit 22. However, because the monitor signal line 15 is shorted to the supply voltage, a Hi level monitor signal is input to the controller 13. Therefore, because of a mismatch between the monitor signal (Hi) and the control signal (Lo), the controller 13 diagnoses it as abnormal.

Here, although the short to supply of the monitor signal line 15 cannot be detected for Condition 31, the load 11 is driven at a high speed as commanded and no trouble occurs with the driving of the load 11. Because the control signal toggles between Hi and Lo levels, the short to supply of the monitor signal line 15 can be detected when the controller outputs a signal for low-speed driving of the load 11. Thus, in the fault diagnosis system relevant to the second embodiment, the controller 13 can recognize a fault as the short to supply of the monitor signal line 15.

As noted above, according to the fault diagnosis system relevant to the second embodiment, in the case where trouble occurs with the driving of the load 11, as there is a mismatch between proper (commanded) load driving and actual load driving (Conditions 19, 20, 22, 23, 26; shaded cells in FIG. 5), it is possible to positively detect that a fault occurs in the load driving arrangement. In the case where a fault (breaking, short to ground, or short to supply) occurs in the control signal line 14 or the monitor signal line 15 (Conditions 21 to 32), by the alternation of high-speed and low-speed driving of the load 11, while no trouble occurs with the driving itself of the load 11, it is possible to positively detect the fault in the control signal line 14 or the monitor signal line 15.

According to the fault diagnosis system relevant to the second embodiment, it is thus possible to detect a fault in the load 11 and the driver 12 as well as a fault in the control signal line 14 or the monitor signal line 15 by means of a very simple configuration.

<Third Embodiment>

Figure 6:
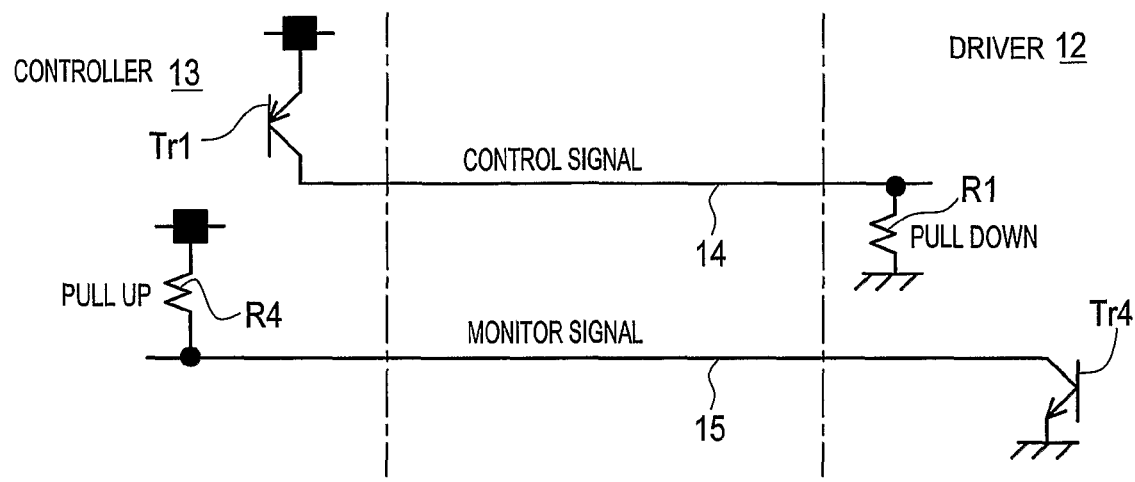
FIG. 6 is a diagram showing the input/output circuits of a controller and a driver in a fault diagnosis system in a load driving arrangement relevant to a third (seventh) embodiment.

Then, a third embodiment is described. The third embodiment differs from the first and second embodiments only in that the input/output circuits of the controller 13 and the driver 12 are configured differently. That is, these circuits are configured such that the control signal is input as a pulled-down input and the monitor signal is input as a pulled-up input, as is shown in FIG. 6. In particular, a PNP type transistor Tr1 is connected to the controller 13 end of the control signal line 14 and a grounded pull-down resistor R1 is connected to the driver 12 end of this line. On the other hand, an NPN type transistor Tr4 is connected to the driver 12 (fault detecting unit 21) end of the monitor signal line 15 and a pull-up resistor R4 connected to a supply voltage is connected to the controller 13 end of this line. FIG. 6 is a diagram showing the configuration of the input/output circuits of the controller 13 and the driver 12. The fault diagnosis system of the third embodiment is essentially the same as the first embodiment with the exception of the configuration of the input/output circuits of the controller 13 and the driver 12 and, therefore, the same reference numbers are assigned to the main components and duplicated description is omitted, where appropriate.

This arrangement of the input/output circuits enables the controller 13 to output a Hi level signal (high-speed drive signal) to the driver 12 by turning the transistor Tr1 on and output a Lo level signal (low-speed drive signal) by turning the transistor Tr1 off. On the other hand, this arrangement enables the driver 12 to output a Hi level signal to the controller 13 by turning the transistor Tr4 off and output a Lo level signal by turning the transistor Tr4 on.

Although an actual monitor signal is the XOR of a control signal input to the driver 12 and a detection signal output from the fault detecting unit 21, which is output as a monitor signal, the exclusive OR portion is not shown for simplification in FIG. 6 to simplify explanation.

For this fault diagnosis system relevant to the third embodiment, the aspects of its operation, as is shown in FIG. 7, when there is no fault in the load driving arrangement (Conditions 33, 34), in the event that a fault occurs in the load 11 or the driver 12 (Conditions 35, 36), and in the event that a fault occurs in the control signal line 14 (Conditions 37 to 42), are the same as described for the first embodiment except that on-off switching of the transistor Tr4 for outputting the monitor signal is performed in a different way from operating the corresponding transistor in the first embodiment and the same diagnosis results are obtained as for the first embodiment (see FIG. 3). FIG. 7 tabulates operation aspects of the fault diagnosis system relevant to the third embodiment.

The aspect of the operation in the event that a fault occurs in the monitor signal line 15 (Conditions 43 to 48) is the same as described for the second embodiment except that on-off switching of the transistor Tr1 for outputting the control signal is performed in a different way from operating the corresponding transistor in the second embodiment and, as is shown in FIG. 7, the same diagnosis results are obtained as for the second embodiment (see FIG. 5).

Hence, according to the fault diagnosis system relevant to the third embodiment, in the case where trouble occurs with the driving of the load 11, as there is a mismatch between proper (commanded) load driving and actual load driving (Conditions 35, 36, 37, 39, 42; shaded cells in FIG. 7), it is possible to positively detect that a fault occurs in the load driving arrangement. In the case where a fault (breaking, short to ground, or short to supply) occurs in the control signal line 14 or the monitor signal line 15 (Conditions 37 to 48), by the alternation of high-speed and low-speed driving of the load 11, while no trouble occurs with the driving itself of the load 11, it is possible to positively detect the fault in the control signal line 14 or the monitor signal line 15.

According to the fault diagnosis system relevant to the third embodiment, it is thus possible to detect a fault in the load 11 and the driver 12 as well as a fault in the control signal line 14 or the monitor signal line 15 by means of a very simple configuration.

<Fourth Embodiment>

Figure 8:
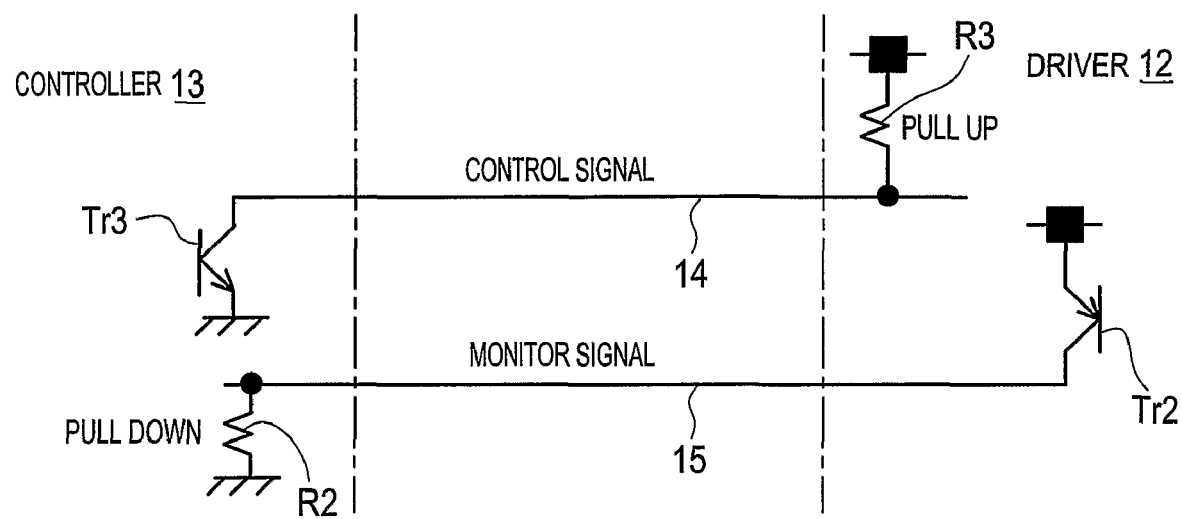
FIG. 8 is a diagram showing the input/output circuits of a controller and a driver in a fault diagnosis system in a load driving arrangement relevant to a fourth (eighth) embodiment.

Then, a fourth embodiment is described. The fourth embodiment differs from the first and second embodiments only in that the input/output circuits of the controller 13 and the driver 12 are configured differently. That is, these circuits are configured such that the control signal is input as a pulled-up input and the monitor signal is input as a pulled-down input, as is shown in FIG. 8. In particular, an NPN type transistor Tr3 is connected to the controller 13 end of the control signal line 14 and a pull-up resistor R3 connected to a supply voltage is connected to the driver 12 end of this line. On the other hand, a PNP type transistor Tr2 is connected to the driver 12 (fault detecting unit 21) end of the monitor signal line 15 and a grounded pull-down resistor R2 is connected to the controller 13 end of this line. FIG. 8 is a diagram showing the configuration of the input/output circuits of the controller 13 and the driver 12. The fault diagnosis system of the fourth embodiment is essentially the same as the first embodiment with the exception of the configuration of the input/output circuits of the controller 13 and the driver 12 and, therefore, the same reference numbers are assigned to the main components and duplicated description is omitted, where appropriate.

This arrangement of the input/output circuits enables the controller 13 to output a Hi level signal (high-speed drive signal) to the driver 12 by turning the transistor Tr3 off and output a Lo level signal (low-speed drive signal) by turning the transistor Tr3 on. On the other hand, this arrangement enables the driver 12 to output a Hi level signal to the controller 13 by turning the transistor Tr2 on and output a Lo level signal by turning the transistor Tr2 off.

Although an actual monitor signal is the XOR of a control signal input to the driver 12 and a detection signal output from the fault detecting unit 21, which is output as a monitor signal, the exclusive OR portion is not shown for simplification in FIG. 8 to simplify explanation.

For this fault diagnosis system relevant to the fourth embodiment, the aspects of its operation, as is shown in FIG. 9, when there is no fault in the load driving arrangement (Conditions 49, 50), in the event that a fault occurs in the load 11 or the driver 12 (Conditions 51, 52), and in the event that a fault occurs in the control signal line 14 (Conditions 53 to 58), are the same as described for the second embodiment except that on-off switching of the transistor Tr2 for outputting the monitor signal is performed in a different way from operating the corresponding transistor in the second embodiment and the same diagnosis results are obtained as for the second embodiment (see FIG. 5). FIG. 9 tabulates operation aspects of the fault diagnosis system relevant to the fourth embodiment.

The aspect of the operation in the event that a fault occurs in the monitor signal line 15 (Conditions 59 to 64) is the same as described for the first embodiment except that on-off switching of the transistor Tr3 for outputting the control signal is performed in a different way from operating the corresponding transistor in the first embodiment and, as is shown in FIG. 9, the same diagnosis results are obtained as for the first embodiment (see FIG. 3).

Hence, according to the fault diagnosis system relevant to the fourth embodiment, in the case where trouble occurs with the driving of the load 11, as there is a mismatch between proper (commanded) load driving and actual load driving (Conditions 51, 52, 54, 55, 58; shaded cells in FIG. 9), it is possible to positively detect that a fault occurs in the load driving arrangement. In the case where a fault (breaking, short to ground, or short to supply) occurs in the control signal line 14 or the monitor signal line 15 (Conditions 53 to 64), by the alternation of high-speed and low-speed driving of the load 11, while no trouble occurs with the driving itself of the load 11, it is possible to positively detect the fault in the control signal line 14 or the monitor signal line 15.

According to the fault diagnosis system relevant to the fourth embodiment, it is thus possible to detect a fault in the load 11 and the driver 12 as well as a fault in the control signal line 14 or the monitor signal line 15 by means of a very simple configuration.

<Fifth Embodiment>

Figure 10:
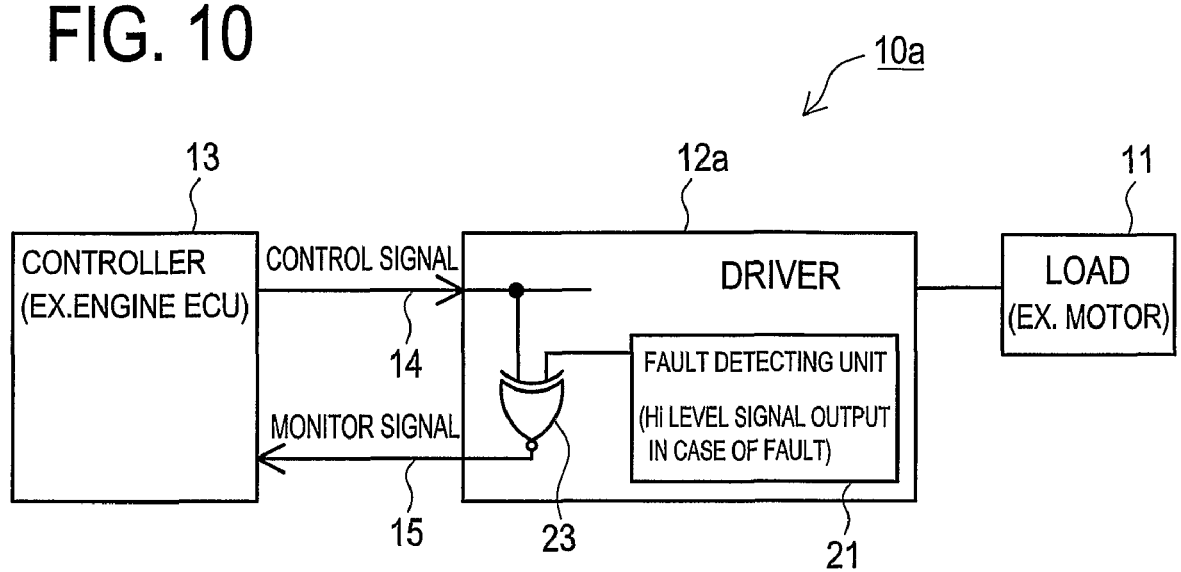
FIG. 10 is a block diagram showing a configuration of a fault diagnosis system in a load driving arrangement relevant to a fifth embodiment of the invention.

Then, a fifth embodiment is described. Difference of the fifth embodiment from the first through fourth embodiments is that the driver is configured differently. A fault diagnosis system in a load driving arrangement relevant to the fifth embodiment is described with reference to FIG. 10. FIG. 10 is a block diagram showing the configuration of the fault diagnosis system in the load driving arrangement relevant to the fifth embodiment.

The fault diagnosis system 10a in the load driving arrangement relevant to the fifth embodiment is comprised of a load (e.g., a motor) 11, a driver 12a for driving the load 11, and a controller (e.g., an engine ECU) 13 which controls the driving of the load 11, as shown in FIG. 10. Between the driver 12a and the controller 13, a control signal line 14 which carries a control signal from the controller 13 to the driver 12a and a monitor signal line 15 which carries a monitor signal from the driver 12a to the controller 13 are provided.

The driver 12a is provided with a fault detecting unit 21 that detects a fault in the load 11 and the driver itself and outputs its detection result as a detection signal. This fault detecting unit 21 is arranged to output a Hi/Lo level signal as the detection signal depending on the presence/absence of a fault in the load 11 and the driver itself. In the preset embodiment, the fault detecting unit 21 is arranged to output a Hi level signal upon detecting a fault.

The driver 12d is also provided with an exclusive NOT OR circuit 23. To this exclusive NOT OR circuit 23, a control signal input to the driver 12a and a detection signal output from the fault detecting unit 21 are discretely input and the XNOR of these signals is output as a monitor signal from the exclusive NOT OR circuit 23.

The input/output circuits of the controller 13 and the driver 12a in the fault diagnosis system 10a are the same as for the first embodiment, as shown in FIG. 2, and configured such that both the control signal and the monitor signal are input as pulled-down inputs.

In the thus configured fault diagnosis system 10a, from the controller 13, a control signal (Hi level signal/Lo level signal) to drive the load 11 is output and this signal is input to the driver 12a. Then, the driver 12a drives the load 11 according to the control signal. At this time, if a fault is detected in the load 11 and the driver 12a, a Hi level detection signal is output from the fault detecting unit 21.

The control signal input to the driver 12a and the detection signal output from the fault detecting unit 21 are input to the exclusive NOT OR circuit 23 and the XNOR signal of these signals is output as a monitor signal from the driver 12a to the controller 13. This arrangement enables the driver 12a to output a signal opposite to the control signal as a monitor signal when there is no fault in the load driving arrangement and output the same signal as the control signal as a monitor signal in the event of a fault occurring in the load driving arrangement.

This arrangement enables the controller 13 to detect a fault in the load 11 and the driver 12a as well as a fault in the control signal line 14 and the monitor signal line 15 by determining whether or not there is a match between the control signal and the monitor signal. That is, the controller 13 can diagnose it as abnormal by a match between the control signal and the monitor signal and diagnose it as normal by a mismatch between the control signal and the monitor signal.

In the following, the operation of the fault diagnosis system 10a is described for each of different fault occurrence situations with reference to FIG. 11. FIG. 11 tabulates operation aspects of the fault diagnosis system relevant to the fifth embodiment.

First, an aspect of the operation, when there is no fault in the load driving arrangement (Conditions 65, 66), is described. For high-speed driving of the load 11, the controller 13 outputs a Hi level signal by turning the transistor Tr1 on. Then, the Hi level signal is input to the driver 12a. In consequence, the load 11 is driven at a high speed as commanded. At this time, since there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. Then, this Lo level monitor signal is input to the controller 13. At this time, because of a mismatch between the monitor signal (Lo) and the control signal (Hi), the controller 13 diagnoses it as normal.

For low-speed driving of the load 11, the controller 13 outputs a Lo level signal by turning the transistor Tr1 off. Then, the Lo level signal is input to the driver 12a. In consequence, the load 11 is driven at a low speed as commanded. At this time, since there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. Then, this Hi level monitor signal is input to the controller 13. At this time, because of a mismatch between the monitor signal (Hi) and the control signal (Lo), the controller 13 diagnoses it as normal.

Next, another aspect of the operation in the event that a fault occurs in the load 11 or the driver 12a (Conditions 67, 68) is described.

For high-speed driving of the load 11, the controller 13 outputs a Hi level signal by turning the transistor Tr1 on. Then, the Hi level signal is input to the driver 12a. However, because a fault is detected by the fault detecting unit 21, the load 11 is regulated by a predetermined action (for example, stop the driving) as specified by product specifications. In the present embodiment, the driving of the load 11 is stopped. At this time, the fault detecting unit 21 outputs a Hi level signal. As a result, the Hi level control signal and the Hi level detection signal are input to the exclusive NOT OR circuit 23 and, therefore, as a monitor signal, a Hi level signal is output from the exclusive NOT OR circuit 23. This Hi level monitor signal is input to the controller 13. At this time, because of a match between the monitor signal (Hi) and the control signal (Hi), the controller 13 diagnoses it as abnormal.

For low-speed driving of the load 11, the controller 13 outputs a Lo level signal by turning the transistor Tr1 off. Then, the Lo level signal is input to the driver 12a. However, due to a fault occurring in the load 11 or the driver 12a, the driving of the load 11 is stopped. At this time, the fault detecting unit 21 outputs a Hi level signal. As a result, the Lo level control signal and the Hi level detection signal are input to the exclusive NOT OR circuit 23 and, therefore, as a monitor signal, a Lo level signal is output from the exclusive NOT OR circuit 23. This Lo level monitor signal is input to the controller 13. At this time, because of a match between the monitor signal (Lo) and the control signal (Lo), the controller 13 diagnoses it as abnormal.

In the fault diagnosis system 10a relevant to the fifth embodiment, in this way, the controller 13 can recognize a fault that occurs in the load 11 or the driver 12a.

Next, another aspect of the operation in the event that the control signal line 14 is broken (Conditions 69, 70) is described.

For high-speed driving of the load 11, the controller 13 outputs a Hi level signal by turning the transistor Tr1 on. However, because the control signal line 14 is broken, a Lo level signal is input to the driver 12a because of the pulled-down input of the control signal. In consequence, the load 11 is driven at a low speed in contradiction to the command. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. This Hi level monitor signal is input to the controller 13. At this time, because of a match between the monitor signal (Hi) and the control signal (Hi), the controller 13 diagnoses it as abnormal.

For low-speed driving of the load 11, the controller 13 outputs a Lo level signal by turning the transistor Tr1 off. However, because the control signal line 14 is broken, a Lo level signal is input to the driver 12a because of the pulled-down input of the control signal. In consequence, the load 11 is driven at a low speed as commanded. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. This Hi level monitor signal is input to the controller 13. At this time, because of a mismatch between the monitor signal (Hi) and the control signal (Lo), the controller 13 diagnoses it as normal.

Although the breaking of the control signal line 14 cannot be detected for Condition 70, as above, the load 11 is driven at a low speed as commanded and no trouble occurs with the driving of the load 11. Because the control signal toggles between Hi and Lo levels, the breaking of the control signal line 14 can be detected when the controller outputs a signal for high-speed driving of the load 11. Thus, in the fault diagnosis system 10a relevant to the fifth embodiment, the controller 13 can recognize a fault as the breaking of the control signal line 14.

Next, another aspect of the operation in the event that the control signal line 14 is shorted to ground (short to ground) (Conditions 71, 72) is described.

For high-speed driving of the load 11, the controller 13 outputs a Hi level signal by turning the transistor Tr1 on. However, because the control signal line 14 is shorted to ground, a Lo level control signal is input to the driver 12a. In consequence, the load 11 is driven at a low speed in contraction to the command. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. This Hi level monitor signal is input to the controller 13. At this time, because of a match between the monitor signal (Hi) and the control signal (Hi), the controller 13 diagnoses it as abnormal.

For low-speed driving of the load 11, the controller 13 outputs a Lo level signal by turning the transistor Tr1 off. Here, because the control signal line 14 is shorted to ground, a Lo level control signal is input to the driver 12a. In consequence, the load 11 is driven at a low speed as commanded. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. This Hi level monitor signal is input to the controller 13. At this time, because of a mismatch between the monitor signal (Hi) and the control signal (Lo), the controller 13 diagnoses it as normal.

Although the short to ground of the control signal line 14 cannot be detected for Condition 72, as above, the load 11 is driven at a low speed as commanded and no trouble occurs with the driving of the load 11. Because the control signal toggles between Hi and Lo levels, the short to ground of the control signal line 14 can be detected when the controller outputs a signal for high-speed driving of the load 11. Thus, in the fault diagnosis system 10a relevant to the fifth embodiment, the controller 13 can recognize a fault as the short to ground of the control signal line 14.

Next, another aspect of the operation in the event that the control signal line 14 is shorted to a supply voltage (short to supply) (Conditions 73, 74) is described.

For high-speed driving of the load 11, the controller 13 outputs a Hi level signal by turning the transistor Tr1 on. At this time, because the control signal line 14 is shorted to the supply voltage, a Hi level control signal is input to the driver 12a. In consequence, the load 11 is driven at a high speed as commanded. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. This Lo level monitor signal is input to the controller 13. At this time, because of a mismatch between the monitor signal (Lo) and the control signal (Hi), the controller 13 diagnoses it as normal.

For low-speed driving of the load 11, the controller 13 outputs a Lo level signal by turning the transistor Tr1 off. At this time, because the control signal line 14 is shorted to the supply voltage, a Hi level control signal is input to the driver 12a. In consequence, the load 11 is driven at a high speed in contradiction to the command. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. This Lo level monitor signal is input to the controller 13. At this time, because of a match between the monitor signal (Lo) and the control signal (Lo), the controller 13 diagnoses it as abnormal.

Here, although the short to supply of the control signal line 14 cannot be detected for Condition 73, the load 11 is driven at a high speed as commanded and no trouble occurs with the driving of the load 11. Because the control signal toggles between Hi and Lo levels, the short to supply of the control signal line 14 can be detected when the controller outputs a signal for low-speed driving of the load 11. Thus, in the fault diagnosis system 10a relevant to the fifth embodiment, the controller 13 can recognize a fault as the short to supply of the control signal line 14.

Next, another aspect of the operation in the event that the monitor signal line 15 is broken (Conditions 75, 76) is described.

For high-speed driving of the load 11, the controller 13 outputs a Hi level signal by turning the transistor Tr1 on. Then, the Hi level control signal is input to the driver 12a. In consequence, the load 11 is driven at a high speed as commanded. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. Here, because the monitor signal line 15 is broken, a Lo level monitor signal is input to the controller 13 because of the pulled-down input of the monitor signal. Therefore, because of a mismatch between the monitor signal (Lo) and the control signal (Hi), the controller 13 diagnoses it as normal.

For low-speed driving of the load 11, the controller 13 outputs a Lo level signal by turning the transistor Tr1 off. Then, the Lo level control signal is input to the driver 12a. In consequence, the load 11 is driven at a low speed as commanded. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. However, because the monitor signal line 15 is broken, a Lo level monitor signal is input to the controller 13 because of the pulled-down input of the monitor signal. Therefore, because of a match between the monitor signal (Lo) and the control signal (Lo), the controller 13 diagnoses it as abnormal.

Here, although the breaking of the monitor signal line 15 cannot be detected for Condition 75, the load 11 is driven at a high speed as commanded and no trouble occurs with the driving of the load 11. Because the control signal toggles between Hi and Lo levels, the breaking of the monitor signal line 15 can be detected when the controller outputs a signal for low-speed driving of the load 11. Thus, in the fault diagnosis system 10a relevant to the fifth embodiment, the controller 13 can recognize a fault as the breaking of the monitor signal line 15.

Next, another aspect of the operation in the event that the monitor signal line 15 is shorted to ground (short to ground) (Conditions 77, 78) is described.

For high-speed driving of the load 11, the controller 13 outputs a Hi level signal by turning the transistor Tr1 on. Then, the Hi level control signal is input to the driver 12a. In consequence, the load 11 is driven at a high speed as commanded. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. Here, because the monitor signal line 15 is shorted to ground, a Lo level monitor signal is input to the controller 13. Therefore, because of a mismatch between the monitor signal (Lo) and the control signal (Hi), the controller 13 diagnoses it as normal.

For low-speed driving of the load 11, the controller 13 outputs a Lo level signal by turning the transistor Tr1 off. Then, the Lo level control signal is input to the driver 12a. In consequence, the load 11 is driven at a low speed as commanded. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. However, because the monitor signal line 15 is shorted to ground, a Lo level monitor signal is input to the controller 13. Therefore, because of a match between the monitor signal (Lo) and the control signal (Lo), the controller 13 diagnoses it as abnormal.

Here, although the short to ground of the monitor signal line 15 cannot be detected for Condition 77, the load 11 is driven at a high speed as commanded and no trouble occurs with the driving of the load 11. Because the control signal toggles between Hi and Lo levels, the short to ground of the monitor signal line 15 can be detected when the controller outputs a signal for low-speed driving of the load 11. Thus, in the fault diagnosis system 10a relevant to the fifth embodiment, the controller 13 can recognize a fault as the short to ground of the monitor signal line 15.

Finally, another aspect of the operation in the event that the monitor signal line 15 is shorted to a supply voltage (short to supply) (Conditions 79, 80) is described.

For high-speed driving of the load 11, the controller 13 outputs a Hi level signal by turning the transistor Tr1 on. Then, the Hi level control signal is input to the driver 12a. In consequence, the load 11 is driven at a high speed as commanded. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. However, because the monitor signal line 15 is shorted to the supply voltage, a Hi level monitor signal is input to the controller 13. Therefore, because of a match between the monitor signal (Hi) and the control signal (Hi), the controller 13 diagnoses it as abnormal.

For low-speed driving of the load 11, the controller 13 outputs a Lo level signal by turning the transistor Tr1 off. Then, the Lo level control signal is input to the driver 12a. In consequence, the load 11 is driven at a low speed as commanded. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. Here, because the monitor signal line 15 is shorted to the supply voltage, a Hi level monitor signal is input to the controller 13. Therefore, because of a mismatch between the monitor signal (Hi) and the control signal (Lo), the controller 13 diagnoses it as normal.

Although the short to supply of the monitor signal line 15 cannot be detected for Condition 80, as above, the load 11 is driven at a low speed as commanded and no trouble occurs with the driving of the load 11. Because the control signal toggles between Hi and Lo levels, the short to supply of the monitor signal line 15 can be detected when the controller outputs a signal for high-speed driving of the load 11. Thus, in the fault diagnosis system 10a relevant to the fifth embodiment, the controller 13 can recognize a fault as the short to supply of the monitor signal line 15.

As noted above, according to the fault diagnosis system 10a relevant to the fifth embodiment, in the case where trouble occurs with the driving of the load 11, as there is a mismatch between proper (commanded) load driving and actual load driving (Conditions 67, 68, 69, 71, 74; shaded cells in FIG. 11), it is possible to positively detect that a fault occurs in the load driving arrangement. In the case where a fault (breaking, short to ground, or short to supply) occurs in the control signal line 14 or the monitor signal line 15 (Conditions 69 to 80), by the alternation of high-speed and low-speed driving of the load 11, while no trouble occurs with the driving itself of the load 11, it is possible to positively detect the fault in the control signal line 14 or the monitor signal line 15.

According to the fault diagnosis system 10a relevant to the fifth embodiment, it is thus possible to detect a fault in the load 11 and the driver 12a as well as a fault in the control signal line 14 or the monitor signal line 15 by means of a very simple configuration.

<Sixth Embodiment>

Then, a sixth embodiment is described. The sixth embodiment differs from the fifth embodiment only in that the input/output circuits of the controller 13 and the driver 12a are configured differently. That is, the input/output circuits of the controller 13 and the driver 12a are configured as shown in FIG. 4 (the same configuration as applied in the second embodiment) and both the control signal and the monitor signal are input as pulled-up inputs.

In the following, the operation of the fault diagnosis system relevant to the sixth embodiment is described for each of different fault occurrence situations with reference to FIG. 12. FIG. 12 tabulates operation aspects of the fault diagnosis system relevant to the sixth embodiment.

First, the aspects of the operation when there is no fault in the load driving arrangement (Conditions 81, 82) and in the event that a fault occurs in the load 11 or the driver 12a (Conditions 83, 84) are the same as described for the fifth embodiment except that on-off switching of the transistors Tr3, Tr4 for outputting the control signal and the monitor signal is performed in a different way from operating the corresponding transistors in the fifth embodiment, therefore, the description of these aspects is omitted.

Next, an aspect of the operation in the event that the control signal line 14 is broken (Conditions 85, 86) is described.

For high-speed driving of the load 11, the controller 13 outputs a Hi level signal by turning the transistor Tr3 off. Here, because the control signal line 14 is broken, a Hi level control signal is input to the driver 12a because of the pulled-up input of the control signal. In consequence, the load 11 is driven at a high speed as commanded. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. This Lo level monitor signal is input to the controller 13. At this time, because of a mismatch between the monitor signal (Lo) and the control signal (Hi), the controller 13 diagnoses it as normal.

For low-speed driving of the load 11, the controller 13 outputs a Lo level signal by turning the transistor Tr3 on. However, because the control signal line 14 is broken, a Hi level control signal is input to the driver 12a because of the pulled-up input of the control signal. In consequence, the load 11 is driven at a high speed in contradiction to the command. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. This Lo level monitor signal is input to the controller 13. At this time, because of a match between the monitor signal (Lo) and the control signal (Lo), the controller 13 diagnoses it as abnormal.

Here, although the breaking of the control signal line 14 cannot be detected for Condition 85, the load 11 is driven at a high speed as commanded and no trouble occurs with the driving of the load 11. Because the control signal toggles between Hi and Lo levels, the breaking of the control signal line 14 can be detected when the controller outputs a signal for low-speed driving of the load 11. Thus, in the fault diagnosis system relevant to the sixth embodiment, the controller 13 can recognize a fault as the breaking of the control signal line 14.

Next, another aspect of the operation in the event that the control signal line 14 is shorted to ground (short to ground) (Conditions 87, 88) is described.

For high-speed driving of the load 11, the controller 13 outputs a Hi level signal by turning the transistor Tr3 off. However, because the control signal line 14 is shorted to ground, a Lo level control signal is input to the driver 12*a*. In consequence, the load 11 is driven at a low speed in contraction to the command. At this time, because there is no fault in the load 11 and the driver 12*a*, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. This Hi level monitor signal is input to the controller 13. At this time, because of a match between the monitor signal (Hi) and the control signal (Hi), the controller 13 diagnoses it as abnormal.

For low-speed driving of the load 11, the controller 13 outputs a Lo level signal by turning the transistor Tr3 on. Here, because the control signal line 14 is shorted to ground, a Lo level control signal is input to the driver 12*a*. In consequence, the load 11 is driven at a low speed as commanded. At this time, because there is no fault in the load 11 and the driver 12*a*, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. This Hi level monitor signal is input to the controller 13. At this time, because of a mismatch between the monitor signal (Hi) and the control signal (Lo), the controller 13 diagnoses it as normal.

Although the short to ground of the control signal line 14 cannot be detected for Condition 88, as above, the load 11 is driven at a low speed as commanded and no trouble occurs with the driving of the load 11. Because the control signal toggles between Hi and Lo levels, the short to ground of the control signal line 14 can be detected when the controller outputs a signal for high-speed driving of the load 11. Thus, in the fault diagnosis system relevant to the sixth embodiment, the controller 13 can recognize a fault as the short to ground of the control signal line 14.

Next, another aspect of the operation in the event that the control signal line 14 is shorted to a supply voltage (short to supply) (Conditions 89, 90) is described.

For high-speed driving of the load 11, the controller 13 outputs a Hi level signal by turning the transistor Tr3 off. At this time, because the control signal line 14 is shorted to the supply voltage, a Hi level control signal is input to the driver 12*a*. In consequence, the load 11 is driven at a high speed as commanded. At this time, because there is no fault in the load 11 and the driver 12*a*, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. This Lo level monitor signal is input to the controller 13. At this time, because of a mismatch between the monitor signal (Lo) and the control signal (Hi), the controller 13 diagnoses it as normal.

For low-speed driving of the load 11, the controller 13 outputs a Lo level signal by turning the transistor Tr3 on. However, because the control signal line 14 is shorted to the supply voltage, a Hi level control signal is input to the driver 12*a*. In consequence, the load 11 is driven at a high speed in contraction to the command. At this time, because there is no fault in the load 11 and the driver 12*a*, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. This Lo level monitor signal is input to the controller 13. At this time, because of a match between the monitor signal (Lo) and the control signal (Lo), the controller 13 diagnoses it as abnormal.

Here, although the short to supply of the control signal line 14 cannot be detected for Condition 89, the load 11 is driven at a high speed as commanded and no trouble occurs with the driving of the load 11. Because the control signal toggles between Hi and Lo levels, the short to supply of the control signal line 14 can be detected when the controller outputs a signal for low-speed driving of the load 11. Thus, in the fault diagnosis system relevant to the sixth embodiment, the controller 13 can recognize a fault as the short to supply of the control signal line 14.

Next, another aspect of the operation in the event that the monitor signal line 15 is broken (Conditions 91, 92) is described.

For high-speed driving of the load 11, the controller 13 outputs a Hi level signal by turning the transistor Tr3 off. Then, the Hi level control signal is input to the driver 12*a*. In consequence, the load 11 is driven at a high speed as commanded. At this time, because there is no fault in the load 11 and the driver 12*a*, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. However, because the monitor signal line 15 is broken, a Hi level monitor signal is input to the controller 13 because of the pulled-up input of the monitor signal. Therefore, because of a match between the monitor signal (Hi) and the control signal (Hi), the controller 13 diagnoses it as abnormal.

For low-speed driving of the load 11, the controller 13 outputs a Lo level signal by turning the transistor Tr3 on. Then, the Lo level control signal is input to the driver 12*a*. In consequence, the load 11 is driven at a low speed as commanded. At this time, because there is no fault in the load 11 and the driver 12*a*, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. Here, because the monitor signal line 15 is broken, a Hi level monitor signal is input to the controller 13 because of the pulled-up input of the monitor signal. Therefore, because of a mismatch between the monitor signal (Hi) and the control signal (Lo), the controller 13 diagnoses it as normal.

Although the breaking of the monitor signal line 15 cannot be detected for Condition 92, as above, the load 11 is driven at a low speed as commanded and no trouble occurs with the driving of the load 11. Because the control signal toggles between Hi and Lo levels, the breaking of the monitor signal line 15 can be detected when the controller outputs a signal for high-speed driving of the load 11. Thus, in the fault diagnosis system relevant to the sixth embodiment, the controller 13 can recognize a fault as the breaking of the monitor signal line 15.

Next, another aspect of the operation in the event that the monitor signal line 15 is shorted to ground (short to ground) (Conditions 93, 94) is described.

For high-speed driving of the load 11, the controller 13 outputs a Hi level signal by turning the transistor Tr3 off. Then, the Hi level control signal is input to the driver 12a. In consequence, the load 11 is driven at a high speed as commanded. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. Here, because the monitor signal line 15 is shorted to ground, a Lo level monitor signal is input to the controller 13. Therefore, because of a mismatch between the monitor signal (Lo) and the control signal (Hi), the controller 13 diagnoses it as normal.

For low-speed driving of the load 11, the controller 13 outputs a Lo level signal by turning the transistor Tr3 on. Then, the Lo level control signal is input to the driver 12a. In consequence, the load 11 is driven at a low speed as commanded. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. However, because the monitor signal line 15 is shorted to ground, a Lo level monitor signal is input to the controller 13. Therefore, because of a match between the monitor signal (Lo) and the control signal (Lo), the controller 13 diagnoses it as abnormal.

Here, although the short to ground of the monitor signal line 15 cannot be detected for Condition 93, the load 11 is driven at a high speed as commanded and no trouble occurs with the driving of the load 11. Because the control signal toggles between Hi and Lo levels, the short to ground of the monitor signal line 15 can be detected when the controller outputs a signal for low-speed driving of the load 11. Thus, in the fault diagnosis system relevant to the sixth embodiment, the controller 13 can recognize a fault as the short to ground of the monitor signal line 15.

Finally, another aspect of the operation in the event that the monitor signal line 15 is shorted to a supply voltage (short to supply) (Conditions 95, 96) is described.

For high-speed driving of the load 11, the controller 13 outputs a Hi level signal by turning the transistor Tr3 off. Then, the Hi level control signal is input to the driver 12a. In consequence, the load 11 is driven at a high speed as commanded. At this time, because there is no fault in the load 11 and the driver 12a, the fault detecting unit 21 outputs a Lo level signal. As a result, the Hi level control signal and the Lo level detection signal are input to the exclusive NOT OR circuit 23 and, therefore, as a monitor signal, a Lo level signal is output from the exclusive NOT OR circuit 23. However, because the monitor signal line 15 is shorted to the supply voltage, a Hi level monitor signal is input to the controller 13. Therefore, because of a match between the monitor signal (Hi) and the control signal (Hi), the controller 13 diagnoses it as abnormal.

For low-speed driving of the load 11, the controller 13 outputs a Lo level signal by turning the transistor Tr3 on. Then, the Lo level control signal is input to the driver 12a. In consequence, the load 11 is driven at a low speed as commanded. At this time, because there is no fault in the load 11 and the driver 12a, the fault detecting unit 21 outputs a Lo level signal. As a result, the Lo level control signal and the Lo level detection signal are input to the exclusive NOT OR circuit 23 and, therefore, as a monitor signal, a Hi level signal is output from the exclusive NOT OR circuit 23. Here, because the monitor signal line 15 is shorted to the supply voltage, a Hi level monitor signal is input to the controller 13. Therefore, because of a mismatch between the monitor signal (Hi) and the control signal (Lo), the controller 13 diagnoses it as normal.

Although the short to supply of the monitor signal line 15 cannot be detected for Condition 96, the load 11 is driven at a low speed as commanded and no trouble occurs with the driving of the load 11. Because the control signal toggles between Hi and Lo levels, the short to supply of the monitor signal line 15 can be detected when the controller outputs a signal for high-speed driving of the load 11. Thus, in the fault diagnosis system relevant to the sixth embodiment, the controller 13 can recognize a fault as the short to supply of the monitor signal line 15.

As noted above, according to the fault diagnosis system relevant to the sixth embodiment, in the case where trouble occurs with the driving of the load 11, as there is a mismatch between proper (commanded) load driving and actual load driving (Conditions 83, 84, 86, 87, 90; shaded cells in FIG. 12), it is possible to positively detect that a fault occurs in the load driving arrangement. In the case where a fault (breaking, short to ground, or short to supply) occurs in the control signal line 14 or the monitor signal line 15 (Conditions 85 to 96), by the alternation of high-speed and low-speed driving of the load 11, while no trouble occurs with the driving itself of the load 11, it is possible to positively detect the fault in the control signal line 14 or the monitor signal line 15.

According to the fault diagnosis system relevant to the sixth embodiment, it is thus possible to detect a fault in the load 11 and the driver 12a as well as a fault in the control signal line 14 or the monitor signal line 15 by means of a very simple configuration.

<Seventh Embodiment>

Then, a seventh embodiment is described. The seventh embodiment differs from the fifth and sixth embodiments only in that the input/output circuits of the controller 13 and the driver 12a are configured differently. That is, these circuits are configured such that the control signal is input as a pulled-down input and the monitor signal is input as a pulled-up input, as shown in FIG. 6, as is the case for the third embodiment.

For this fault diagnosis system relevant to the seventh embodiment, the aspects of its operation, as is shown in FIG. 13, when there is no fault in the load driving arrangement (Conditions 97, 98), in the event that a fault occurs in the load 11 or the driver 12a (Conditions 99, 100), and in the event that a fault occurs in the control signal line 14 (Conditions 101 to 106), are the same as described for the fifth embodiment except that on-off switching of the transistor Tr4 for outputting the monitor signal is performed in a different way from operating the corresponding transistor in the fifth embodiment and the same diagnosis results are obtained as for the fifth embodiment (see FIG. 11). FIG. 13 tabulates operation aspects of the fault diagnosis system relevant to the seventh embodiment.

The aspect of the operation in the event that a fault occurs in the monitor signal line 15 (Conditions 107 to 112) is the same as described for the sixth embodiment except that on-off switching of the transistor Tr1 for outputting the control signal is performed in a different way from operating the corresponding transistor in the sixth embodiment and, as is shown in FIG. 13, the same diagnosis results are obtained as for the sixth embodiment (see FIG. 12).

Hence, according to the fault diagnosis system relevant to the seventh embodiment, in the case where trouble occurs with the driving of the load 11, as there is a mismatch between proper (commanded) load driving and actual load driving (Conditions 99, 100, 101, 103, 106; shaded cells in FIG. 13), it is possible to positively detect that a fault occurs in the load driving arrangement. In the case where a fault (breaking, short to ground, or short to supply) occurs in the control signal line 14 or the monitor signal line 15 (Conditions 101 to 112), by the alternation of high-speed and low-speed driving of the load 11, while no trouble occurs with the driving itself of the load 11, it is possible to positively detect the fault in the control signal line 14 or the monitor signal line 15.

According to the fault diagnosis system relevant to the seventh embodiment, it is thus possible to detect a fault in the load 11 and the driver 12a as well as a fault in the control signal line 14 or the monitor signal line 15 by means of a very simple configuration.

<Eighth Embodiment>

Then, an eighth embodiment is described. The eighth embodiment differs from the fifth and sixth embodiments only in that the input/output circuits of the controller 13 and the driver 12a are configured differently. That is, these circuits are configured such that the control signal is input as a pulled-up input and the monitor signal is input as a pulled-down input, as shown in FIG. 8, as is the case for the fourth embodiment.

For this fault diagnosis system relevant to the eighth embodiment, the aspects of its operation, as is shown in FIG. 14, when there is no fault in the load driving arrangement (Conditions 113, 114), in the event that a fault occurs in the load 11 or the driver 12a (Conditions 115, 116), and in the event that a fault occurs in the control signal line 14 (Conditions 117 to 122), are the same as described for the sixth embodiment except that on-off switching of the transistor Tr2 for outputting the monitor signal is performed in a different way from operating the corresponding transistor in the sixth embodiment and the same diagnosis results are obtained as for the sixth embodiment (see FIG. 12). FIG. 14 tabulates operation aspects of the fault diagnosis system relevant to the eighth embodiment.

The aspect of the operation in the event that a fault occurs in the monitor signal line 15 (Conditions 123 to 128) is the same as described for the fifth embodiment except that on-off switching of the transistor Tr3 for outputting the control signal is performed in a different way from operating the corresponding transistor in the fifth embodiment and, as is shown in FIG. 14, the same diagnosis results are obtained as for the fifth embodiment (see FIG. 11).

Hence, according to the fault diagnosis system relevant to the eighth embodiment, in the case where trouble occurs with the driving of the load 11, as there is a mismatch between proper (commanded) load driving and actual load driving (Conditions 115, 116, 118, 119, 122; shaded cells in FIG. 14), it is possible to positively detect that a fault occurs in the load driving arrangement. In the case where a fault (breaking, short to ground, or short to supply) occurs in the control signal line 14 or the monitor signal line 15 (Conditions 117 to 128), by the alternation of high-speed and low-speed driving of the load 11, while no trouble occurs with the driving itself of the load 11, it is possible to positively detect the fault in the control signal line 14 or the monitor signal line 15.

According to the fault diagnosis system relevant to the eighth embodiment, it is thus possible to detect a fault in the load 11 and the driver 12a as well as a fault in the control signal line 14 or the monitor signal line 15 by means of a very simple configuration.

<Ninth Embodiment>

Figure 15:
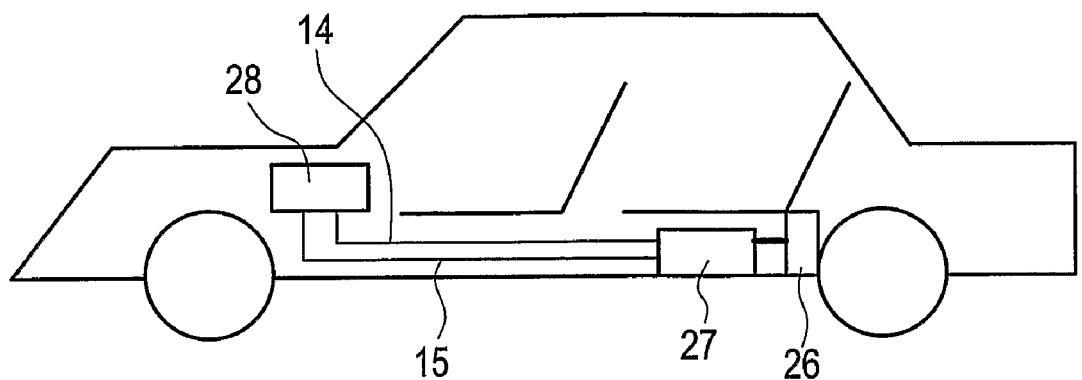
FIG. 15 is a schematic diagram showing an outline configuration of a fuel pump control system relevant to a ninth embodiment of the invention.

Then, a ninth embodiment is described. As the ninth embodiment, a fuel pump control system of a motor vehicle applying the above-described fault diagnosis system is described. Now, the fuel pump control system relevant to the ninth embodiment is described with reference to FIG. 15. FIG. 15 is a schematic diagram showing an outline configuration of the fuel pump control system relevant to the ninth embodiment.

The fuel pump control system relevant to the ninth embodiment applies the fault diagnosis system 10 relevant to the foregoing first embodiment. That is, this fuel pump control system comprises a fuel pump 26, a fuel pump controller 27, and an engine ECU 28 which correspond to the load 11, the driver 12, and the controller 13, respectively, in the fault diagnosis system. The engine ECU 28 is located in the front part of the vehicle and the fuel pump controller 27 and the fuel pump 26 are located in the rear part of the vehicle. Here, between the fuel pump controller 27 and the engine ECU 28, a control signal line 14 which carries a control signal from the engine ECU 28 to the fuel pump controller 27 and a monitor signal line 15 which carries a monitor signal from the fuel pump controller 27 to the engine ECU 28 are provided. Both the control signal line 14 and the monitor signal line 15 are normal cables (for which measures such as thickening the covering of the signal lines and using the signal lines having larger diameter cores are not taken).

The fuel pump controller 27 is provided with a fault detecting unit 21 that detects a fault in the fuel pump 26 and the pump controller itself and outputs its detection result as a detection signal (see FIG. 1). This fault detecting unit 21 is arranged to output a Hi/Lo level signal as the detection signal depending on the presence/absence of a fault in the fuel pump 26 and the pump controller 27 itself. The fault detecting unit 21 is arranged to output a Hi level signal upon detecting a fault.

The fuel pump controller 27 is also provided with an exclusive OR circuit 22 (see FIG. 1). To this exclusive OR circuit 22, a control signal input to the fuel pump controller 27 and a detection signal output from the fault detecting unit 21 are discretely input and the XOR of these signals is output as a monitor signal from the exclusive OR circuit 22.

While the fuel pump control system using the fault diagnosis system 10 relevant to the foregoing first embodiment is discussed here by way of illustration, any of the fault diagnosis systems relevant to the second through eighth embodiments may be used instead of the fault diagnosis system relevant to the first embodiment. Even if a fuel pump control system is realized with one of the fault diagnosis systems relevant to the second through eighth embodiments, it can provide the same advantageous effects as will be described below.

Due to the fact that it applies the above-described fault diagnosis system 10, the fuel pump control system relevant to the ninth embodiment is able to positively detect a fault in the fuel pump 26 and the fuel pump controller 27 as well as positively detect a fault in the control signal line 14 or the monitor signal line 15.

Consequently, according to the fuel pump control system relevant to the ninth embodiment, there is no need to reduce the probability of a fault occurring in the control signal line 14 and the monitor signal line 15. As is shown in FIG. 15, it is possible to locate the fuel pump controller 27 on the far side from the engine ECU 28 (locate the fuel pump controller 27 near the fuel pump 26) without using costly cables for the signal lines. Thus, the flexibility of design of mounting the fuel pump controller 27 is improved. This embodiment is advantageous in terms of cost and weight, because there is no need to take measures such as thickening the covering of the signal lines, using the signal lines having larger diameter cores, and using high-quality connectors to minimize the possibility of contact failure.

<Tenth Embodiment>

Finally, a tenth embodiment is described. The tenth embodiment also relates to a fuel pump control system of a motor vehicle applying the above-described fault diagnosis system. This fuel pump control system has the same basic configuration as the ninth embodiment, but differs from the ninth embodiment in that the fuel pump controller and the fuel pump are combined into a fuel pump module integral with the controller. Therefore, the following description focuses on the difference from the ninth embodiment.

Figure 16:
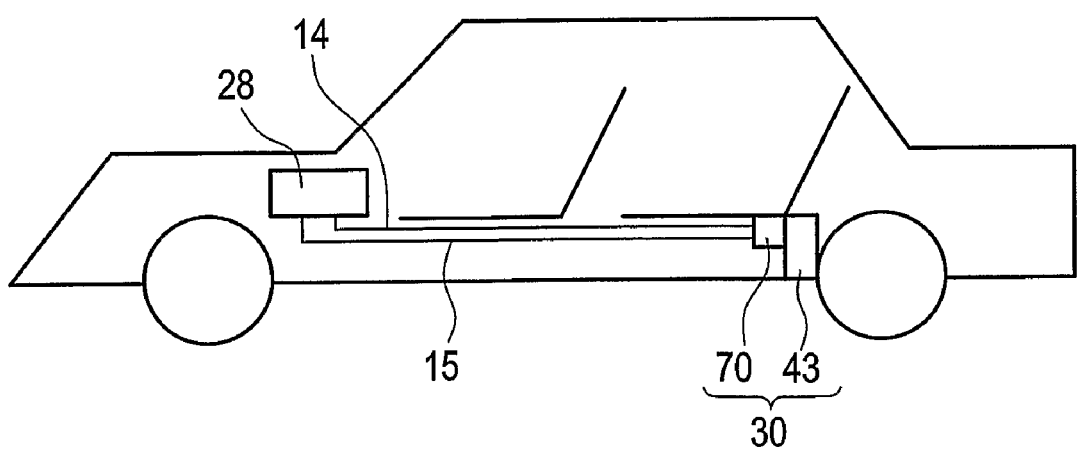
FIG. 16 is a schematic diagram showing an outline configuration of a fuel pump control system relevant to a tenth embodiment of the invention.

First, the fuel pump control system relevant to the tenth embodiment is described with reference to FIG. 16. FIG. 16 is a schematic diagram showing an outline configuration of the fuel pump control system relevant to the tenth embodiment.

The fuel pump control system relevant to the tenth embodiment also applies the fault diagnosis system 10 relevant to the foregoing first embodiment. In this fuel pump control system, as is shown in FIG. 16, an engine ECU 28 is located in the front part of the vehicle and a fuel pump module 30 integral with the controller (into which a fuel pump 43 and a fuel pump controller 70 are combined) is located in the rear part of the vehicle. Here, between the fuel pump module 30 and the engine ECU 28, a control signal line 14 which carries a control signal from the engine ECU 28 to the fuel pump controller 70 and a monitor signal line 15 which carries a monitor signal from the fuel pump controller 70 to the engine ECU 28 are provided.

The fuel pump controller 70 is provided with a fault detecting unit 21 that detects a fault in the fuel pump 43 and the fuel pump controller itself and outputs its detection result as a detection signal (see FIG. 1). This fault detecting unit 21 is arranged to output a Hi/Lo level signal as the detection signal depending on the presence/absence of a fault in the fuel pump 43 and the fuel pump controller 70 itself. The fault detecting unit 21 is arranged to output a Hi level signal upon detecting a fault.

The fuel pump controller 70 is also provided with an exclusive OR circuit 22 (see FIG. 1). To this exclusive OR circuit 22, a control signal input to the fuel pump controller 70 and a detection signal output from the fault detecting unit 21 are discretely input and the XOR of these signals is output as a monitor signal from the exclusive OR circuit 22.

While the fuel pump control system using the fault diagnosis system 10 relevant to the foregoing first embodiment is discussed here by way of illustration, any of the fault diagnosis systems relevant to the second through eighth embodiments may be used instead of the fault diagnosis system relevant to the first embodiment. Even if a fuel pump control system is realized with one of the fault diagnosis systems relevant to the second through eighth embodiments, it can provide the same advantageous effects as will be described later.

Figure 17:
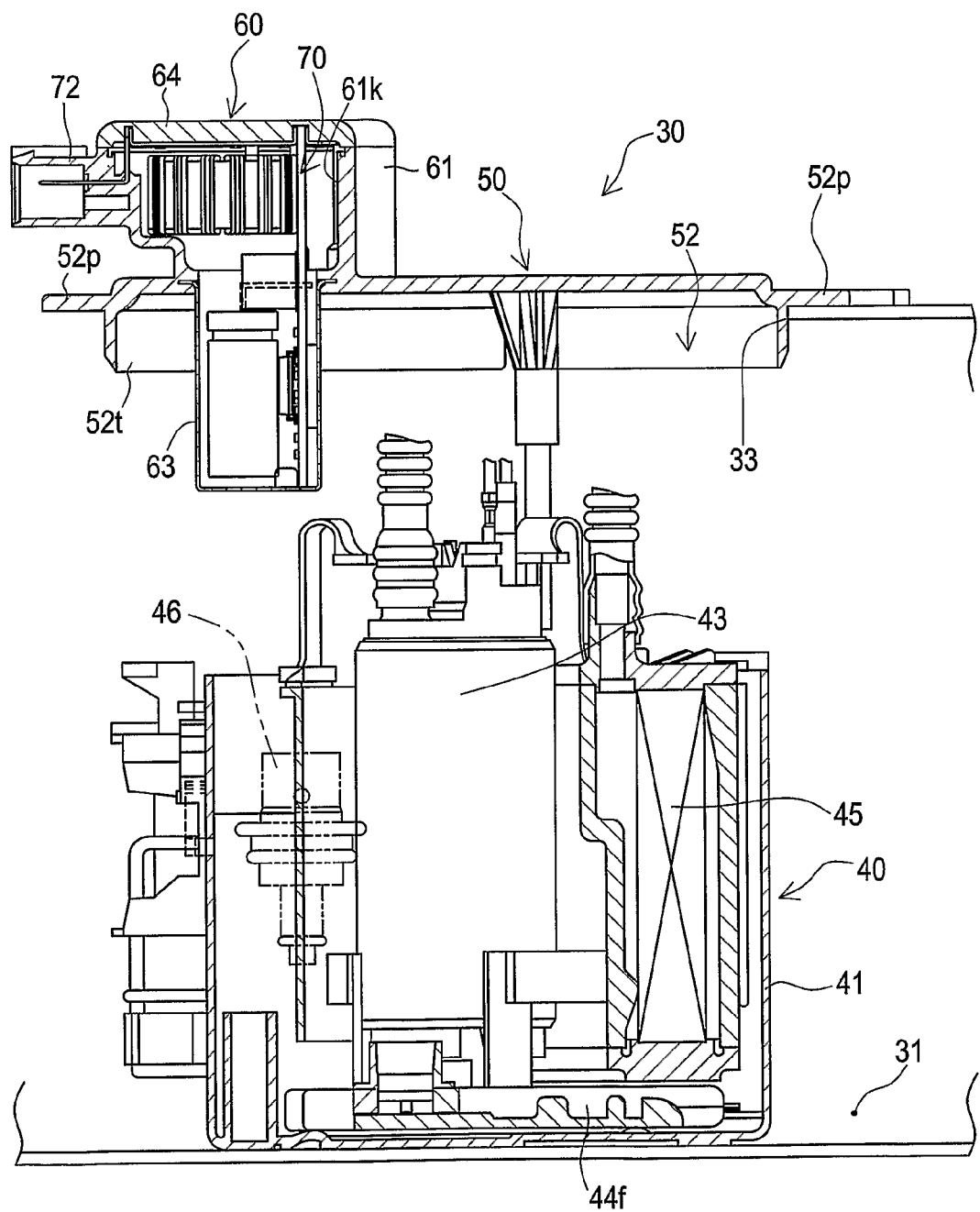
FIG. 17 is a sectional diagram showing an outlined structure of a fuel pump module.
Figure 18:
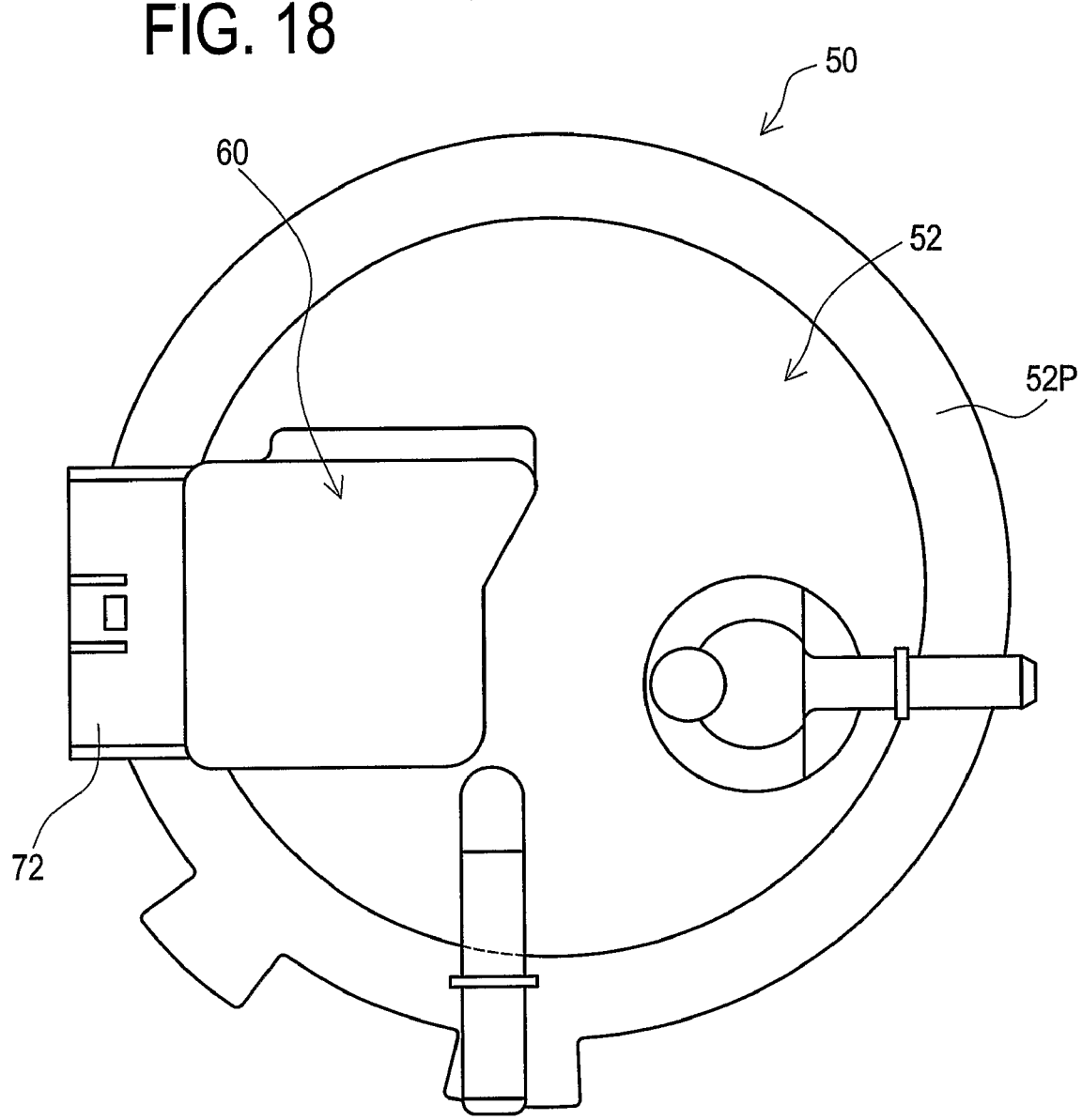
FIG. 18 is a plan view showing a plate member comprised in the fuel pump module.
Figure 19:
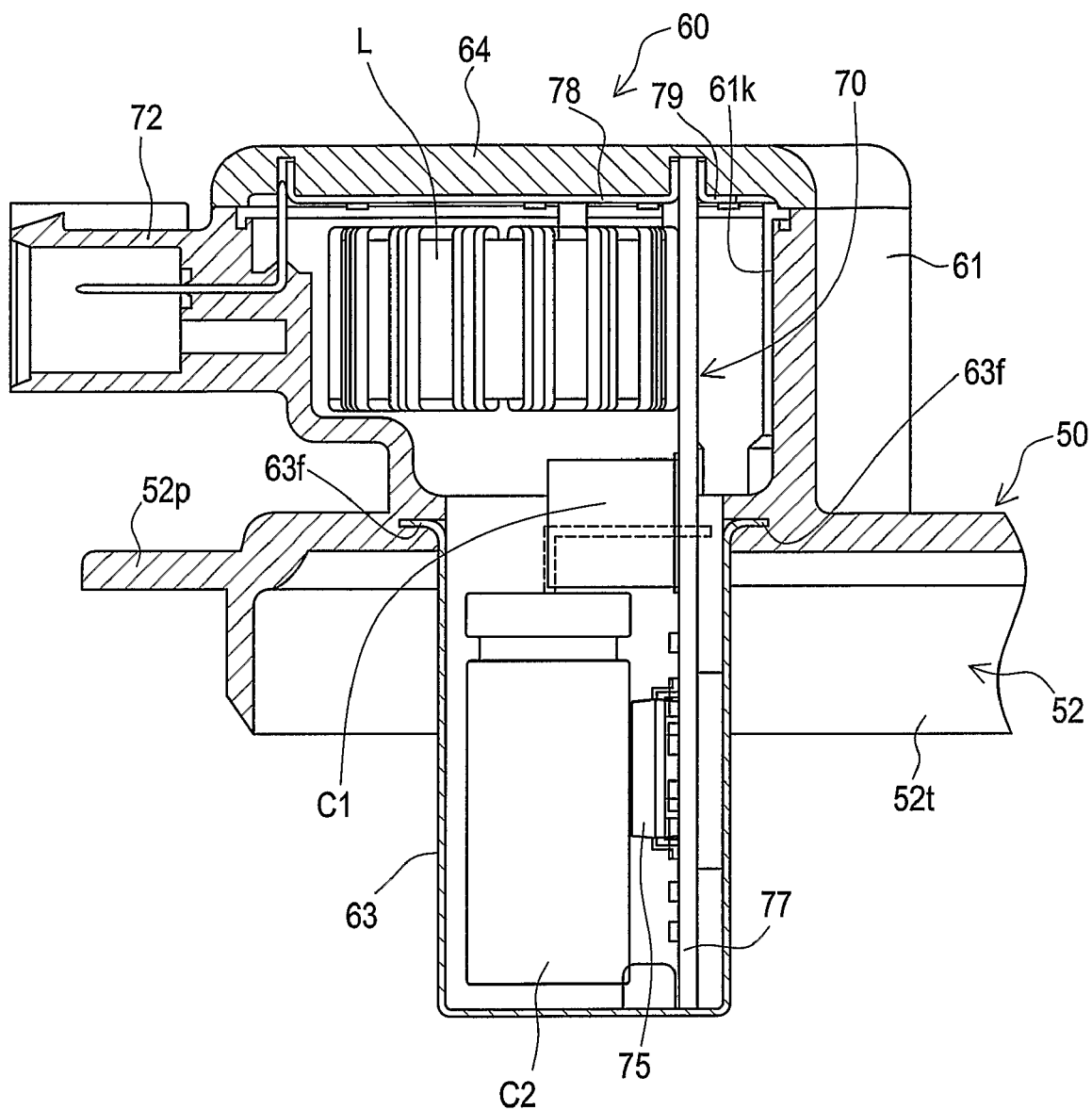
FIG. 19 is an enlarged sectional view of a holder section of the fuel pump module.
Figure 20:
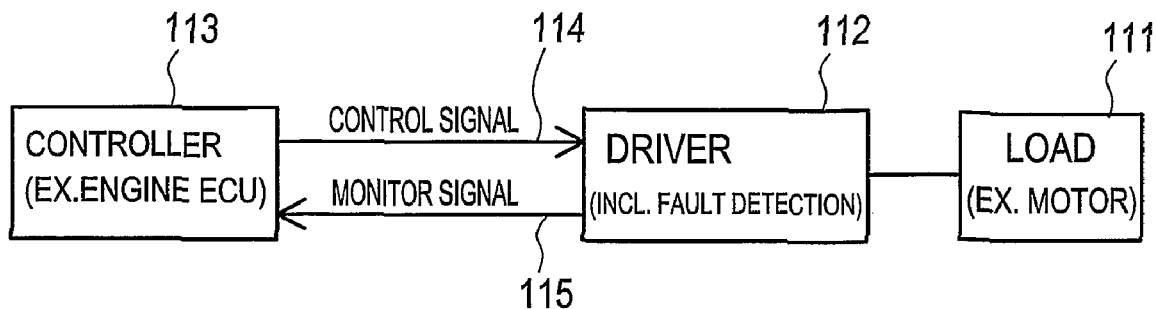
FIG. 20 is a block diagram showing a configuration of a fault diagnosis system in a load driving arrangement of prior art.
Figure 21:
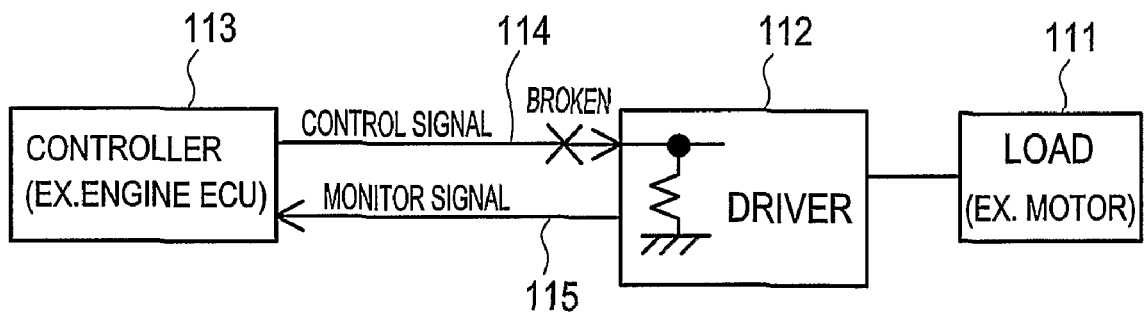
FIG. 21 is a diagram to explain operation in the event of breaking of a control signal line in the system shown in FIG. 20.
Figure 22:
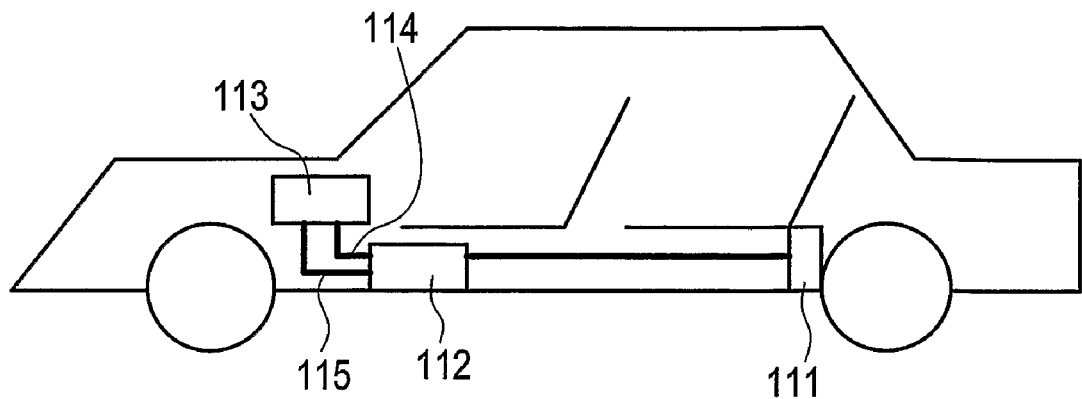
FIG. 22 is a schematic diagram showing an outline configuration of a fuel pump control system of prior art.
Figure 23:
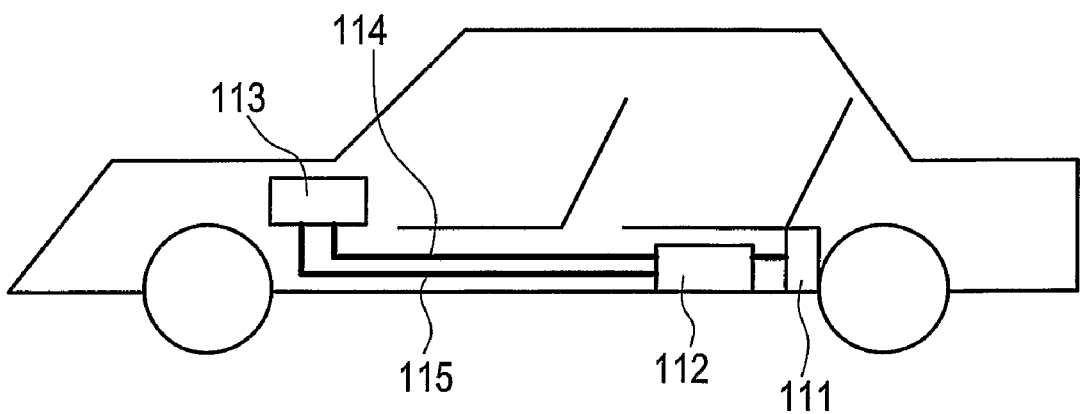
FIG. 23 is a schematic diagram showing an outline configuration of another form of a fuel pump control system of prior art.

Here, the fuel pump module 30 integral with the controller is described with reference to FIGS. 17 to 19. FIG. 17 is a sectional diagram showing an outlined structure of the fuel pump module. FIG. 18 is a plan view showing a plate member comprised in the fuel pump module. FIG. 19 is an enlarged sectional view of a holder section of the fuel pump module.

The fuel pump module 30 is composed of a pump section 40 located in a fuel tank 31, a plate member 50 mounted to cover up an opening 33 at the top of the fuel tank 31, and a fuel pump controller 70 installed in a holder formed integral with the plate member 50.

The pump section 40 is provided with a reservoir cup 41 which is a top-open container installed on the bottom of the fuel tank 31, a fuel pump 43 housed in the reservoir cup 41, a suction filter 44f, a high-pressure filter 45, and a pressure regulator 46.

Here, the fuel pump 43 is a built-in motor driven pump that sucks fuel and pressurizes and discharges the sucked fuel. The suction filter 44f filters the fuel sucked into the fuel pump 43. The high-pressure filter 45 filters the fuel discharged from the fuel pump 43. The pressure regulator 46 regulates the pressure of the fuel discharged from the fuel pump 43 to a predetermined pressure.

The plate member 50 is formed mainly of resin and includes a lid flange part 52 which covers up the opening 33 at the top of the fuel tank 31 and a holder section 60 into which the pump controller 70 that controls the fuel pump 53 is housed. The flange part 52 is of a disk shape and has a cylindrical positioning protrusion part 52t on its under surface. On the rim of this positioning protrusion part 52t, a rim sealer 52p is formed to externally seal the rim portion of the opening 33 at the top of the fuel tank 31.

The holder section 60 is provided near the outer edge of the plate member 50 and formed piercing through the flange part 52 from the front to the other side. This holder section 60 is a bottomed cylindrical container with a lid and comprises a front protrusion portion 61 positioned on the front side of the flange part 52 and an in-tank protrusion portion 63 positioned on the other side (back side) of the flange.

The front protrusion portion 61 is made of resin and formed integral with the flange part 52. On the outer end surface of the front protrusion portion 61, a connector 72 for the fuel pump controller 70 is formed integrally. At the other end, on the top of the front protrusion portion 61, an opening 61k for inserting the fuel pump controller 70 into the holder section 60 is formed and the opening 61k is covered by a resin cover 64.

The in-tank protrusion portion 63 is a bottomed cylindrical housing made of an electrically conductive metal and, at the top end thereof, a flange-like brim 63f is formed on the outer circumference, as is shown in FIG. 19. This brim 63f can be inserted into the die for molding the flange part 52 and the front protrusion portion 61. Thus, the brim 63f is insert molded into the bottom end of the front protrusion portion 61 when the flange part 52 and the front protrusion portion 61 are molded and the bottomed cylindrical holder section 60 in which the in-tank protrusion portion 63 is integrally coupled to the front protrusion portion 61 is formed.

Here, the fuel pump controller 70 that is housed in the holder section 60, thus integrated into fuel pump module, is comprised of a plurality of elemental devices installed on a printed circuit board 77. In particular, the fuel pump controller 70 is configured with capacitors C1, C2, a choke coil L, and an IC chip 75 including a transistor Tr and a diode D installed on the printed circuit board 77 and interconnected by wiring patterns formed on the printed circuit board 77.

The thus configured pump controller 70 is housed in the holder section 60 of the plate member 50 with the printed circuit board 77 set in an upright position, as shown in FIG. 19, and connected to the terminal contact of the connector 52 and the connection contact of the fuel pump 43 via bus bars 78 and 79 molded in the resin cover 64. When the fuel pump controller 70 is housed in the holder section 60, the IC chip 75, the capacitor C2, and a part of the capacitor C1 installed on the printed circuit board 77 are enclosed within the in-tank protrusion portion 63 made of an electrically conductive material. Thus, the transistor Tr and wiring patterns which generate noise are enclosed within the in-tank protrusion portion 63 and electrically shielded.

Moreover, a thermally conductive member 76 is located between the printed circuit board 77 and the inside wall surface of the in-tank protrusion portion 63. This allows heat generated from the transistor Tr within the IC chip 75 to dissipate to the in-tank protrusion portion 63 efficiently. Since the in-tank protrusion portion 63 contacts with fuel, it is cooled by the fuel and, thus, the IC chip 75 is cooled and the heat generation from the transistor Tr is suppressed. Therefore, a thermal problem does not occur even if a small transistor is used and, consequently, downsizing of the fuel pump controller 70 can be pursued.

Due to the fact that it applies the above-described fault diagnosis system 10, the fuel pump control system relevant to the tenth embodiment is able to positively detect a fault in the fuel pump 43 and the fuel pump controller 70 as well as positively detect a fault in the control signal line 14 or the monitor signal line 15.

Consequently, according to the fuel pump control system relevant to the tenth embodiment, there is no need to reduce the probability of a fault occurring in the control signal line 14 and the monitor signal line 15. As is shown in FIG. 16, it is possible to locate the fuel pump controller 70 integral with the fuel pump 43 on the far from the engine ECU 28 without using costly cables for the signal lines. Thus, the flexibility of design of mounting the fuel pump controller 70 is improved. This embodiment is advantageous in terms of cost and weight, because there is no need to take measures such as thickening the covering of the signal lines, using the signal lines having larger diameter cores, and using high-quality connectors to minimize the possibility of contact failure.

Furthermore, in the fuel pump control system relevant to the tenth embodiment, the fuel pump controller 70 is combined with the fuel pump 43, thus forming the fuel pump module 30 integral with the controller. Owing to this, the length of wiring between the fuel pump controller 70 and the fuel pump 43 can be shortened (to the shortest possible) as compared with the ninth embodiment in which the fuel pump controller 70 and the fuel pump 43 are separate components. The amount of work necessary for assembly into the vehicle can be reduced and downsizing of the fuel pump control system can be pursued.

The forgoing embodiments should be construed as only illustrative and it will be appreciated that the present invention is not limited to the embodiments presented above and may be embodied in other improved or modified forms without departing from the scope of the invention.

In the foregoing embodiments, for instance, although the fault detecting unit 21 and the exclusive OR circuit 22 are built in the driver 12 and the fault detecting unit 21 and the exclusive NOT OR circuit 23 are built in the driver 12a, these components can also be configured as separate entities from the drivers 12, 12a.

While the fault detecting unit 21 is arranged to output a Hi level signal upon detecting a fault in the load 11 and the driver 12 (driver 12a), it can also be arranged to output a Lo level signal upon detecting a fault. However, in this case, it is needed to change the circuit configuration for outputting the monitor signal.

While, in the foregoing tenth embodiment, wiring between the fuel pump controller 70 and the fuel pump 43 is performed via the bus bars, this wiring may also be possible with pattern wiring and copper wires, not limited to the bus bars.

The invention claimed is:

1. A fault diagnosis system in a load driving arrangement, the fault diagnosis system, comprising:
   a load;
   a driver that drives the load according to a control signal; and
   a controller that outputs the control signal,
   wherein the driver comprises a fault detecting means, comprising:
      a load/driver fault detecting unit that detects a fault in at least either the load or the driver, and outputs a detection result as a detection signal of a high level or a low level depending on whether the load/driver fault detecting unit detects a fault or not, and
      a logic circuit which is input the detection signal and the control signal, and which outputs, as a monitor signal, a signal opposite to the control signal when the load/driver fault detecting unit detects a fault in the load driving arrangement and which outputs, as a monitor signal, a signal same as the control signal when the load/driver fault detecting unit does not detect a fault in the load driving arrangement, and
   wherein the controller takes an input of the monitor signal output from the fault detecting means, makes a comparison of the control signal and the monitor signal, and diagnoses whether a fault occurs in the load driving arrangement, based on a result of the comparison.

2. The fault diagnosis system in the load driving arrangement according to claim 1, wherein:
   the logic circuit is an exclusive OR circuit which outputs an XOR of the control signal and the detection signal, and
   the controller takes an input of a signal output from the exclusive OR circuit as the monitor signal.

3. The fault diagnosis system in the load driving arrangement according to claim 1, wherein:
   the controller makes a diagnosis that a fault occurs in the load driving arrangement, when there is a mismatch between the control signal and the monitor signal.

4. A fault diagnosis system in a load driving arrangement, the fault diagnosis system, comprising:
   a load;
   a driver that drives the load according to a control signal; and
   a controller that outputs the control signal,
   wherein the driver comprises a fault detecting means comprising:
      a load/driver fault detecting unit that detects a fault in at least either the load or the driver, and outputs a detection result as a detection signal of a high level or a low level depending on whether the load/driver fault detecting unit detects a fault or not, and
      a logic circuit which is input the detection signal and the control signal, and which outputs, as a monitor signal, a signal same as the control signal when the load/driver fault detecting unit detects a fault in the load driving arrangement and which outputs, as a monitor signal, a signal opposite to the control signal when the load/driver fault detecting unit does not detect a fault in the load driving arrangement, and the controller takes an input of the monitor signal output from the fault detecting means and diagnoses whether a fault occurs in the load driving arrangement, based on the monitor signal.

5. The fault diagnosis system in a load driving arrangement according to claim 4, wherein:
the logic circuit is an exclusive OR circuit which outputs an XOR of the control signal and the detection signal, and
the controller takes an input of a signal output from the exclusive OR circuit as the monitor signal.

6. The fault diagnosis system in the load driving arrangement according to claim 4, wherein:
the controller makes a diagnosis that a fault occurs in the load driving arrangement, when there is a mismatch between the control signal and the monitor signal.

7. A fuel pump control system comprising an engine ECU, a fuel pump, and a fuel pump controller which controls the fuel pump according to a command from the engine ECU, wherein:
the fault diagnosis system according to claim 1 is realized such that the engine ECU, the fuel pump controller, and the fuel pump correspond to the controller, the driver, and the load, respectively, in the fault diagnosis system.

8. The fuel pump control system according to claim 7, wherein:
the engine ECU is located in either a front part or a rear part of a vehicle; and
the fuel pump controller is located on a far side from the engine ECU.

9. A fuel pump control system comprising an engine ECU, a fuel pump, and a fuel pump controller which controls the fuel pump according to a command from the engine ECU, wherein:
the fault diagnosis system according to claim 4 is realized such that the engine ECU, the fuel pump controller, and the fuel pump correspond to the controller, the driver, and the load, respectively, in the fault diagnosis system.

10. The fuel pump control system according to claim 9, wherein:
the engine ECU is located either a front part or a rear part of a vehicle; and
the fuel pump controller is located on a far side from the engine ECU.

11. A fuel pump control system comprising an engine ECU, a fuel pump, and a fuel pump controller which controls the fuel pump according to a command from the engine ECU, wherein:
the fault diagnosis system according to claim 1 is realized such that the engine ECU, the fuel pump controller, and the fuel pump correspond to the controller, the driver, and the load, respectively, in the fault diagnosis system; and
the fuel pump controller is combined with the fuel pump, thus forming a fuel pump module integral with a controller.

12. The fuel pump control system according to claim 11, wherein:
the fuel pump controller is integrally installed on a plate member for mounting the fuel pump in a fuel tank.

13. The fuel pump control system according to claim 11, wherein:
wiring between the fuel pump controller and the fuel pump is performed by means of bus bars, wiring patterns, or copper wires; and
the wiring is insert molded into a resin member integrated into the plate member.

14. The fuel pump control system according to claim 11, wherein:
the engine ECU is located in either a front part or a rear part of a vehicle; and
the fuel pump module integral with a controller is located on a far side from the engine ECU.

15. A fuel pump control system comprising an engine ECU, a fuel pump, and a fuel pump controller which controls the fuel pump according to a command from the engine ECU, wherein:
the fault diagnosis system according to claim 4 is realized such that the engine ECU, the fuel pump controller, and the fuel pump correspond to the controller, the driver, and the load, respectively, in the fault diagnosis system; and
the fuel pump controller is combined with the fuel pump, thus forming a fuel pump module integral with a controller.

16. The fuel pump control system according to claim 15, wherein:
the fuel pump controller is integrally installed on a plate member for mounting the fuel pump in a fuel tank.

17. The fuel pump control system according to claim 15, wherein:
wiring between the fuel pump controller and the fuel pump is performed by means of bus bars, wiring patterns, or copper wires; and
the wiring is insert molded into a resin member integrated into the plate member.

18. The fuel pump control system according to claim 15, wherein:
the engine ECU is located in either a front part or a rear part of a vehicle; and
the fuel pump module integral with a controller is located on a far side from the engine ECU.

* * * * *